US011099714B2

(12) United States Patent
Imbruce et al.

(10) Patent No.: US 11,099,714 B2
(45) Date of Patent: Aug. 24, 2021

(54) SYSTEMS AND METHODS INVOLVING CREATION/DISPLAY/UTILIZATION OF INFORMATION MODULES, SUCH AS MIXED-MEDIA AND MULTIMEDIA MODULES

(71) Applicant: VERIZON MEDIA INC., New York, NY (US)

(72) Inventors: Doug Imbruce, New York, NY (US); Owen Bossola, Brooklyn, NY (US); Rasmus Knutsson, New York, NY (US); Hakim El Hattab, New York, NY (US); Tommy Chheng, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 457 days.

(21) Appl. No.: 13/781,382

(22) Filed: Feb. 28, 2013

(65) Prior Publication Data

US 2017/0068310 A1    Mar. 9, 2017

Related U.S. Application Data

(60) Provisional application No. 61/604,485, filed on Feb. 28, 2012, provisional application No. 61/604,487, (Continued)

(51) Int. Cl.
*G06F 16/48* (2019.01)
*G06F 16/438* (2019.01)
(Continued)

(52) U.S. Cl.
CPC .......... *G06F 3/0482* (2013.01); *G06F 3/0488* (2013.01); *G06F 16/438* (2019.01);
(Continued)

(58) Field of Classification Search
CPC ........ G06F 3/01; G06F 16/907; G06F 16/438; G06F 16/48; G06F 3/0482
See application file for complete search history.

(56) References Cited

U.S. PATENT DOCUMENTS 6,108,033 A   8/2000 Ito et al.
6,173,437 B1  1/2001 Polcyn
(Continued)

FOREIGN PATENT DOCUMENTS

CN    101262395 A   9/2008
CN    101339548 A   1/2009
WO    2007064715 A2  6/2007

OTHER PUBLICATIONS

Agarwal, Amit; "How to Embed Almost Anything in your Website" (2009).
(Continued)

*Primary Examiner* — Taelor Kim
(74) *Attorney, Agent, or Firm* — James J. DeCarlo; Greenberg Traurig, LLP

(57) ABSTRACT

Systems and methods are directed to implementations involving creation, viewing, playing sharing and/or utilization of information modules, such as mixed-media modules. A processor communicates a mixed-media module creator interface to a first client device. The mixed-media module creator interface is configured to enable a first user of the first client device to create a mixed-media module, the mixed-media module comprising both an updatable portion and a searchable portion, and communicating a mixed-media module player interface to a second client device, the mixed-media module player interface different than the mixed-media module creator interface and configured to enable a second user using the second client device to play the mixed-media module in a non-linear format.

15 Claims, 48 Drawing Sheets

Related U.S. Application Data filed on Feb. 28, 2012, provisional application No. 61/604,488, filed on Feb. 28, 2012, provisional application No. 61/604,490, filed on Feb. 28, 2012, provisional application No. 61/604,495, filed on Feb. 28, 2012, provisional application No. 61/604,496, filed on Feb. 28, 2012, provisional application No. 61/605,176, filed on Feb. 29, 2012, provisional application No. 61/605,180, filed on Feb. 29, 2012.

(51) Int. Cl.
*G06F 16/78* (2019.01)
*G06F 16/907* (2019.01)
*G06F 3/0482* (2013.01)
*G06F 3/0488* (2013.01)

(52) U.S. Cl.
CPC ............. *G06F 16/48* (2019.01); *G06F 16/78* (2019.01); *G06F 16/907* (2019.01); *G06F 2200/1637* (2013.01)

(56) References Cited

U.S. PATENT DOCUMENTS

| | | | |
|---|---|---|---|
| 6,271,840 B1 | 8/2001 | Finseth et al. | |
| 6,353,448 B1 | 3/2002 | Scarborough et al. | |
| 6,535,888 B1 | 3/2003 | Vijayan et al. | |
| 6,567,103 B1 | 5/2003 | Chaudhry | |
| 6,574,417 B1 | 6/2003 | Lin et al. | |
| 7,200,820 B1 | 4/2007 | Stephens | |
| 7,536,706 B1* | 5/2009 | Sezan | G06F 17/30817 725/112 |
| 7,613,731 B1 | 11/2009 | Larson | |
| 7,725,451 B2 | 5/2010 | Jing et al. | |
| 7,836,110 B1 | 11/2010 | Schoenbach et al. | |
| 7,895,193 B2 | 2/2011 | Cucerzan et al. | |
| 7,962,128 B2 | 6/2011 | Neven et al. | |
| 8,055,655 B1 | 11/2011 | He et al. | |
| 8,078,650 B2 | 12/2011 | McHugh et al. | |
| 8,244,707 B2 | 8/2012 | Lin et al. | |
| 8,255,291 B1 | 8/2012 | Nair | |
| 8,352,443 B1 | 1/2013 | Polson et al. | |
| 8,549,436 B1 | 10/2013 | Capriati et al. | |
| 8,577,911 B1 | 11/2013 | Stepinski et al. | |
| 8,639,034 B2 | 1/2014 | Liu et al. | |
| 8,769,053 B2* | 7/2014 | Spitz et al. | 709/219 |
| 8,782,690 B2* | 7/2014 | Briggs et al. | 725/32 |
| 8,813,132 B2* | 8/2014 | Andrews et al. | 725/60 |
| 9,147,154 B2 | 9/2015 | Wang et al. | |
| 9,183,277 B1 | 11/2015 | Kurzion et al. | |
| 2004/0205515 A1 | 10/2004 | Socolow et al. | |
| 2005/0216859 A1 | 9/2005 | Paek et al. | |
| 2006/0253436 A1 | 11/2006 | Cook et al. | |
| 2007/0008322 A1 | 1/2007 | Ludwigsen | |
| 2007/0078872 A1 | 4/2007 | Cohen | |
| 2007/0101387 A1* | 5/2007 | Hua et al. | 725/113 |
| 2007/0185860 A1 | 8/2007 | Lissack | |
| 2007/0203945 A1 | 8/2007 | Louw | |
| 2007/0214121 A1 | 9/2007 | Ebanks | |
| 2007/0234214 A1* | 10/2007 | Lovejoy et al. | 715/719 |
| 2007/0250899 A1* | 10/2007 | Rhodes | G11B 27/034 725/136 |
| 2008/0027928 A1 | 1/2008 | Larson | |
| 2008/0028037 A1 | 1/2008 | Moyer et al. | |
| 2008/0086688 A1 | 4/2008 | Chandratillake et al. | |
| 2008/0215416 A1 | 9/2008 | Ismalon | |
| 2008/0244373 A1 | 10/2008 | Morris et al. | |
| 2008/0276269 A1* | 11/2008 | Miller et al. | 725/34 |
| 2009/0003800 A1 | 1/2009 | Bodin et al. | |
| 2009/0019034 A1 | 1/2009 | Franks et al. | |
| 2009/0063423 A1 | 3/2009 | Kelly et al. | |
| 2009/0077037 A1 | 3/2009 | Wu et al. | |
| 2009/0210790 A1* | 8/2009 | Thomas | G06Q 30/0603 715/719 |
| 2009/0271842 A1 | 10/2009 | Baumhof | |
| 2009/0313260 A1 | 12/2009 | Mimatsu | |
| 2009/0327268 A1 | 12/2009 | Denney et al. | |
| 2010/0083077 A1 | 4/2010 | Paulsen et al. | |
| 2010/0146042 A1 | 6/2010 | Kruhoeffer et al. | |
| 2010/0211565 A1 | 8/2010 | Lotito | |
| 2010/0332489 A1 | 12/2010 | Benari et al. | |
| 2011/0010367 A1 | 1/2011 | Jockish et al. | |
| 2011/0060756 A1 | 3/2011 | Schoenbach et al. | |
| 2011/0064387 A1 | 3/2011 | Mendeloff et al. | |
| 2011/0161333 A1 | 6/2011 | Langseth et al. | |
| 2011/0196864 A1 | 8/2011 | Mason et al. | |
| 2011/0288913 A1 | 11/2011 | Waylonis et al. | |
| 2012/0047134 A1 | 2/2012 | Hansson et al. | |
| 2012/0051668 A1 | 3/2012 | Martin et al. | |
| 2012/0059838 A1 | 3/2012 | Berntson et al. | |
| 2012/0124457 A1* | 5/2012 | Yuniardi | G06F 17/30056 715/204 |
| 2012/0198325 A1* | 8/2012 | Kief | G06F 17/2241 715/234 |
| 2012/0203757 A1 | 8/2012 | Ravindran | |
| 2012/0249870 A1 | 10/2012 | Senster | |
| 2012/0323897 A1 | 12/2012 | Daher et al. | |
| 2013/0097125 A1 | 4/2013 | Marvasti et al. | |

OTHER PUBLICATIONS

Crosby, Connie; "Prezi: Shaking Off the PowerPoint Death Grip", http://www.slaw.ca/2010/10/25/prezi-shaking-off-the-powerpoint-death-grip/ (2010).
European Search Report in correspopnding EP Application No. 12859456.1 dated Jan. 7, 2016.
https://getsatisfaction.com/prezi/topics/creating links that jump to other parts of the prezi (2010).
International Search Report (PCT/US13/45529) dated Feb. 27, 2014; 4 pages.
Limpag, Max, "Forget PowerPoint wow 'em with Prezi", http://max.impag.com/article/powerpoint-prezi-presentation (2011).
O'Neill, Megan, "7 Little Known Tricks That Will Get You More YouTube Views", http://www.adweek.com/sociatimes/get-more-youtube-views/44158 (2011).
Supplemental European Search Report (EP12857892) dated Mar. 24, 2016.

* cited by examiner

SYSTEMS AND METHODS INVOLVING CREATION/DISPLAY/UTILIZATION OF INFORMATION MODULES, SUCH AS MIXED-MEDIA AND MULTIMEDIA MODULES

CROSS-REFERENCE TO RELATED APPLICATIONS

This claims priority from U.S. provisional application No. 61/604,485 filed on Feb. 28, 2012; U.S. provisional application No. 61/604,487 filed on Feb. 28, 2012; U.S. provisional application No. 61/604,488 filed on Feb. 28, 2012; U.S. provisional application No. 61/604,490 filed on Feb. 28, 2012; U.S. provisional application No. 61/604,495 filed on Feb. 28, 2012; U.S. provisional application No. 61/604, 496 filed on Feb. 28, 2012; U.S. provisional application No. 61/605,176 filed on Feb. 29, 2012; and U.S. provisional application No. 61/605,180 filed on Feb. 29, 2012, all of which are hereby incorporated by reference in their entirety.

BACKGROUND

Field

Aspects of the present innovations relate to information modules, and, more particularly, to associated systems and methods, such as those involving creation, viewing and/or utilization of mixed-media modules.

Description of Related Information

At the moment, narrative—or playable—content on the internet primarily exists in the form of streaming video. This poses several problems for content creators. First of all, media consumers are sophisticated and recognize the difference between professionally produced video projects and amateur ones. Most consumer devices display High Definition video and most people are used to seeing that level of quality in media they consume. Therefore, a producer of online content must invest significant time and money to create video content at the level to which consumers have grown accustomed. Producing video is time-consuming, expensive and often requires specialized skills. For example, a video editor might spend hours editing just five minutes of video. Production often entails a professional production crew, on-camera talent, and equipment such as a professional lighting kit, high-end cameras, and audio gear.

The video post-production process is also time-consuming. Editing requires expensive software, a skilled editor with technical and story-telling skills, and, possibly, the hiring of a graphic designer, special effects artist and/or narrator. Editing software also utilizes a lot of computing resources, typically requiring sophisticated, expensive and fast computing/storage equipment. There is also a high learning curve when it comes to using any of these editing tools and each piece of software usually requires a large financial commitment.

Another complication with video production is that the audio tracks are often recorded and edited separately from the video tracks and the two (or more than two) must be synchronized and edited into one timeline. This can be laborious and time-consuming. Moreover, if needed, animation is costly, often proprietary, and difficult to produce. It often requires specific software in addition to the software used for editing. Video and animation files are large and cumbersome which means that a powerful computer, with a great deal of storage space, is needed. Finally, the amount of time it takes for the software to render a final product also adds to the overall time and expense. Once a video is complete it is difficult to make changes. This is a problem because, without updates, video is outdated quickly. Re-editing a video is time-consuming and complicated and there is no way to integrate "live data" or "updatable components." Video is also bandwidth-heavy when streaming on the web and does not play in an acceptable manner over a poor internet connection.

Additionally, video is a stand-alone, self-contained, linear medium. It is not interactive and it is difficult to embed a layer of meta-data which would make it interactive. For instance, it is not easy for a content producer to link on-screen content to information elsewhere on the web. While a video may contain motion graphics, still photos or animations, it cannot display PDF files, text files and links to other content in a way that is useful for the audience. Nor is it easy to create "chapters." For example, in a YouTube video a viewer cannot jump ahead to a specific chapter or section within the video. Any content that is embedded is "locked in" and is not easy to move or change. It can't contain links embedded into player for a true interactive experience. In sum, many such issues stem from the requirement that it be rendered (or re-rendered). As such, the creator of the content cannot easily link a video back to their own site so their only option is to place that information in the credits along with any other links they may wish to share.

Once a video is complete it may not reach everyone in the intended audience. For one thing, video is tough to view on mobile devices which are optimized for portability rather than processing power. Animations, in particular, are not compatible with all mobile platforms (i.e. iOS, Android, Blackberry, flash/non-flash) which means that potential audience members are excluded.

Advertising connected to video is also not ideal because it interrupts the flow of the video. Advertising in the pre-roll of a video prevents a user from getting to the content quickly, post-roll advertising is easy to ignore and if ads are inserted into the middle of content it is annoying and disruptive. One negative result of video advertising or banner ads is that it can send a viewer on a detour away from their desired content. Another option, banner or overlay ads, completely disrupt the user's experience, appear cheap, have no visual relevance and reflect poorly on the advertiser. None of these ads are related to the content or relevant to the user. As a result, the advertising mostly annoys the user, isn't helpful and doesn't have a great return on investment (ROI) for the advertiser. This is reflected by the low click-through rates on web ads.

Yet another challenge is that, without human curation, video is complicated to search and requires highly intelligent, algorithm-based content scanning systems to "tag" content as a specific category. This is time consuming, not always accurate and would be improved if there were a way for meta-data from the embedded content to be included in the content. Most systems are reliant on user input, like PageRank, which is impossible to scale in video. There is a need for a richer, searchable set of data.

As such, there is a need for systems and methods that address the above drawbacks an/or provide other beneficial functionality or advantages to parties involved with creating, viewing, sharing and/or utilizing such information modules.

OVERVIEW OF SOME ASPECTS

Systems and methods consistent with the present innovations are directed to implementations involving creation, viewing, playing, sharing and/or utilization of information modules, such as mixed-media modules. Embodiments herein are directed to web-based tools for editing content into a rich, mixed-media capable, interactive components, or "mixed-media modules". In regard to content that is already edited together into such modules, other embodiments herein are directed to a "Player" configured to present coordinated text, images, documents, narrations and links all available in one or more, interactive screen format(s) and/or window(s). These Player implementations may be embedded into mobile devices and appliances, played on a webpage, or integrated into various other processing environments.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and features of the present inventions and, together with the description, explain aspects of innovations herein. In the drawings.

DETAILED DESCRIPTION OF ILLUSTRATIVE IMPLEMENTATIONS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

According to some implementations, systems and methods consistent with the innovations herein are directed to creation, viewing, playing, sharing and/or utilization of information modules, such as mixed-media modules. For example, aspects herein involve innovative aspects of a rich, mixed-media, interactive components, as also sometimes referred to in places herein via the 'Qwiki'™ brand component or module. In some implementations, this component or module may be an interactive narrative presentation of media and/or content and it may feature an interactive layer configured to allow viewers to receive more detailed information from within the information module.

Figure 1:
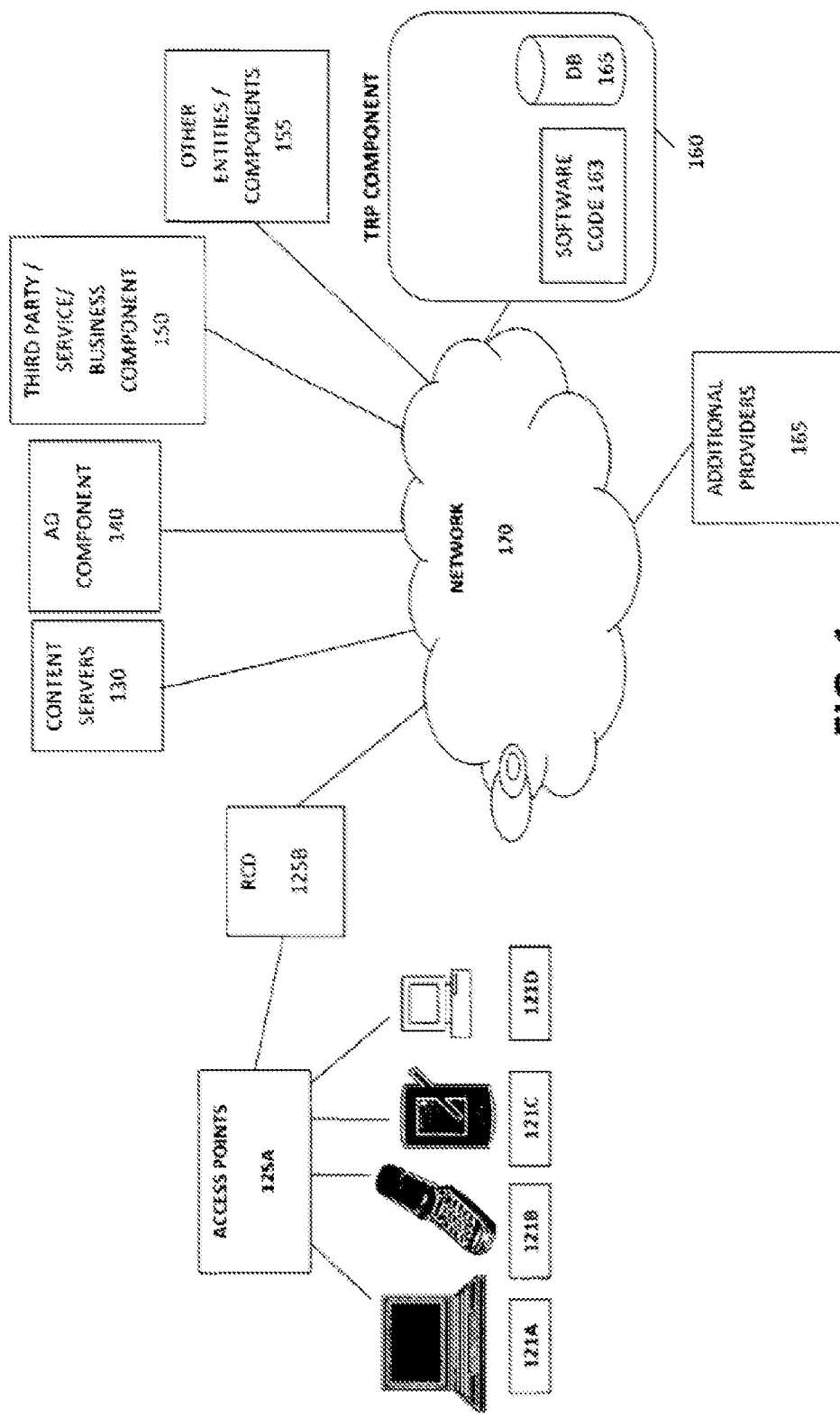
FIG. 1 is a box diagram of an illustrative web or network-based implementations consistent with certain aspects related to the innovations herein.

FIG. 1 is a box diagram of an illustrative web or network-based implementations consistent with certain aspects related to the innovations herein. While the description of FIG. 1 shows various elements, the components of the system can be implemented through any suitable unitary or distributed combination of hardware, software and/or firmware. Referring to FIG. 1, the illustrated system may include a mixed-media module ("MMM") component 160, users at access devices 121 (e.g., one or more of access devices 121A-121D), one or more connectivity components 125A/125B, as well as possibly other unitary, connected, interconnected or distributed processing entities or components such as additional providers 165 such as network management components, content servers 130, ad components 140, service/business components 150, and other third party servers or components 155, all connected over a network 170. The mixed-media module component 160 may, in some implementations, be the web-based creation and/or playing/viewing tool for handling certain mixed-media module innovations herein.

According to some implementations, systems and methods associated with creation of information modules herein may be web-based tools for editing online content into a rich, mixed-media capable, interactive component referred to as a "mixed-media module." In one illustrative implementation, for example, there is provided a web-based method for creating mixed-media modules comprising providing an interface operable by a user to access a web-based information module creator engine/component(s), providing web pages and interactive functionality, via the interface, programmed to allow the user to select a plurality of types of content and drop the selected content into a narrative presentation outline to create a presentation of media, providing web pages and interactive functionality, via the interface, programmed to allow the user to edit the content and/or presentation of the content via the interface, and generating a mixed-media module via integration of the selected content into a playable presentation of the content. Further, the playable mixed-media module may be configured such that the mixed-media module comprises of a plurality of image media elements connected in sequence as well as two or more types of media content selected from text, hyperlink, image, audio, document and video.

With respect to media thereby assembled into such modules, other embodiments herein are directed to "Player" implementations configured to present coordinated text, images, documents, narrations and links all available in one or more, interactive screen format(s) and/or window(s). These Player implementations may be embedded into mobile devices and appliances, played on a webpage, or integrated into various other processing environments. In one illustrative implementation, for example, there is provided a web-based method for utilizing mixed-media modules, comprising providing an interface operable a user to access a web-based information module utilizing engine/component(s), providing web pages and interactive functionality, via the interface, programmed to allow the user to view the information module playing over a web-based interface as a playable presentation, and providing web pages and interactive functionality, via the interface, programmed to allow the user to interact with the mixed-media module and/or associated content. Here, again, the mixed-media module may comprises of a plurality of image media elements connected in sequence as well as two or more types of media content selected from text, hyperlink, image, audio, document and video. Further implementations may be configured such that the user may interact with the mixed-media module and/or associated content configured to provide access to at least one of additional third party information, sites, content, applications and/or other multimedia.

Systems and methods of mixed-media module creation and playing give online content producers tools to create a professional looking presentation without the time and expense of video. Implementations allow "media editing in the cloud," but innovations herein also go beyond straightforward web or cloud advantages. Authors of information modules herein can create an audio-visual presentation by compiling multimedia content (photos, videos, documents, maps, etc), from their devices or across the web, into a creator application ("Creator") available via the web or downloaded onto their device. Here, for example, the author can "drag and drop" the desired content into the Creator and build a "playable" presentation, as explained in more detail below. That presentation may be viewed much like video and may include a linear story line, but it is improves upon video technology because the audience is not required to experience the module in a linear fashion. The technology is innovative for content producers because—unlike video—they do not merely create a finite, linear presentation. The Creator allows an author to create a limitless and updatable, searchable story within the compact, module or component. For example, an author may edit a module that plays for three minutes from start to finish, but contains thirty minutes of searchable content.

In some implementations, once a mixed-media module has been created, the Player may derive a layer of interactivity from individual pieces of content which are linked to their original sources on the web. This means that a viewer can either watch a mixed-media module in a linear format or they can self-select a path through the content by clicking on hyperlinks within the Qwiki. The viewer is able to explore the information that is of the most interest to them, in greater detail, and in their preferred format (i.e. text, photos, or video). Further, according to some systems and methods herein, Creator/Player implementations may innovative over existing systems due to the information density and mixed-media/multimedia capabilities of the mixed-media module component(s).

Further integrations of such components with search results also involve creation of new ad units (and thereby, in some implementations, new sources of revenue) inside of the mixed-media interactive summary, as explained further below.

Consistent with certain implementations, another way systems and methods herein may depart from the traditional media experiences, especially from online video, is that the end user does not have to experience the mixed-media module in a linear fashion. The user can choose their path through the content with various functionality, such as clicking on hyperlinks within the mixed-media module, via navigation functionality/gestures, and the like. This allows the end-user to explore the information that is of the most interest to them, in greater detail and in their preferred format, e.g., text, photos, video, etc.

In addition to the display of related media/links in a new window on the same page, further implementations provide functionality to display associated content on the same page by instantly modifying it or the contents around it. Here, for example, this new integrated content may be displayed without triggering new tabs.

Especially in view of the issued with traditional video content noted above, systems and methods herein are an improvement on other rich media such as online video technology because they use less bandwidth, are easily customizable, flexible, incorporate interactive video, images, text and other types of media.

In still other exemplary embodiments herein, mixed-media module integrated implementations can incorporate interactive images, text and other types of media. Further, given such implementations operate without large-bandwidth video transmissions especially rendered video content for audiovisual/multimedia experience, systems and methods herein provide improved functionality between mixed media and mobile devices, thus allowing for quicker loads and consumption of less bandwidth during utilization.

Referring now to FIGS. 2-7, implementations herein with mixed-media module integrations involving video can yield improved/higher quality on mobile devices, consistent with aspects of the innovations herein. Such implementations may be web-based or downloadable applications downloaded to the mobile device. In one illustrative implementation, for example, there is provided a method for providing a downloadable application for creating mixed-media modules, the method comprising providing an executable application for download to a user device, the executable application configured for providing an interface operable by a user to execute an information module creator engine/component(s), providing interactive functionality, via the interface, to allow the user to select a plurality of types of content and drop the selected content into a narrative presentation outline to create a presentation of media, providing interactive functionality, via the interface, to allow the user to edit the content and/or presentation of the content via the interface, and generating a mixed-media module via integration of the selected content into a playable presentation of the content configured for low-bandwidth and/or non-rendered utilization to facilitate display on a mobile device.

Additionally, given the flexible and non-rendered nature of the mixed-media modules, streaming and picture quality can be easily optimized for specific mobile devices. Further, such implementations allow ease of interactions by providing a standard universal layer for interactivity. In other embodiments, systems and methods herein may include features and implementations involving interactive and coordinated hyperlinks for deeper exploration of the content within the embedded media—this feature of coordinating links/content inside of the mixed-media module interactive summary allow new attribution and monetization capabilities by content creators and other entities involved with handling the underlying module(s).

Here, it should be noted that a "mobile device" can be any kind of smartphone, tablet computer, laptop, notebook, or any kind of similar device. These devices are typically touch screen enabled and retain internet connectivity through either a shorter range radio such as those used in WiFi technologies, or through cellular telephone connections, or both. The device may connect to the internet in any fashion.

Figure 2:
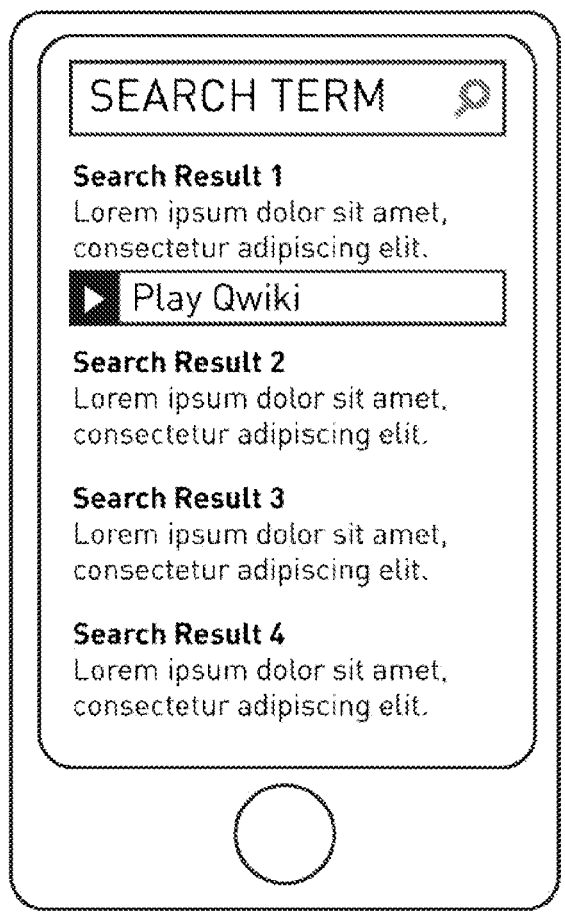
FIG. 2 is an exemplary screenshot showing an illustrative mobile device display including a search engine results page with integrated mixed-media component consistent with certain aspects related to the innovations herein.

FIG. 2 depicts an illustrative web page involving a mixed-media module implementation, formatted for a mobile smartphone or tablet computer, consistent with aspects of the innovations herein. As shown, for example, an illustrative "Play Qwiki module" icon is shown directly beneath an associated piece of identifying textual information, here, a search result in a search result screen.

Figure 3:
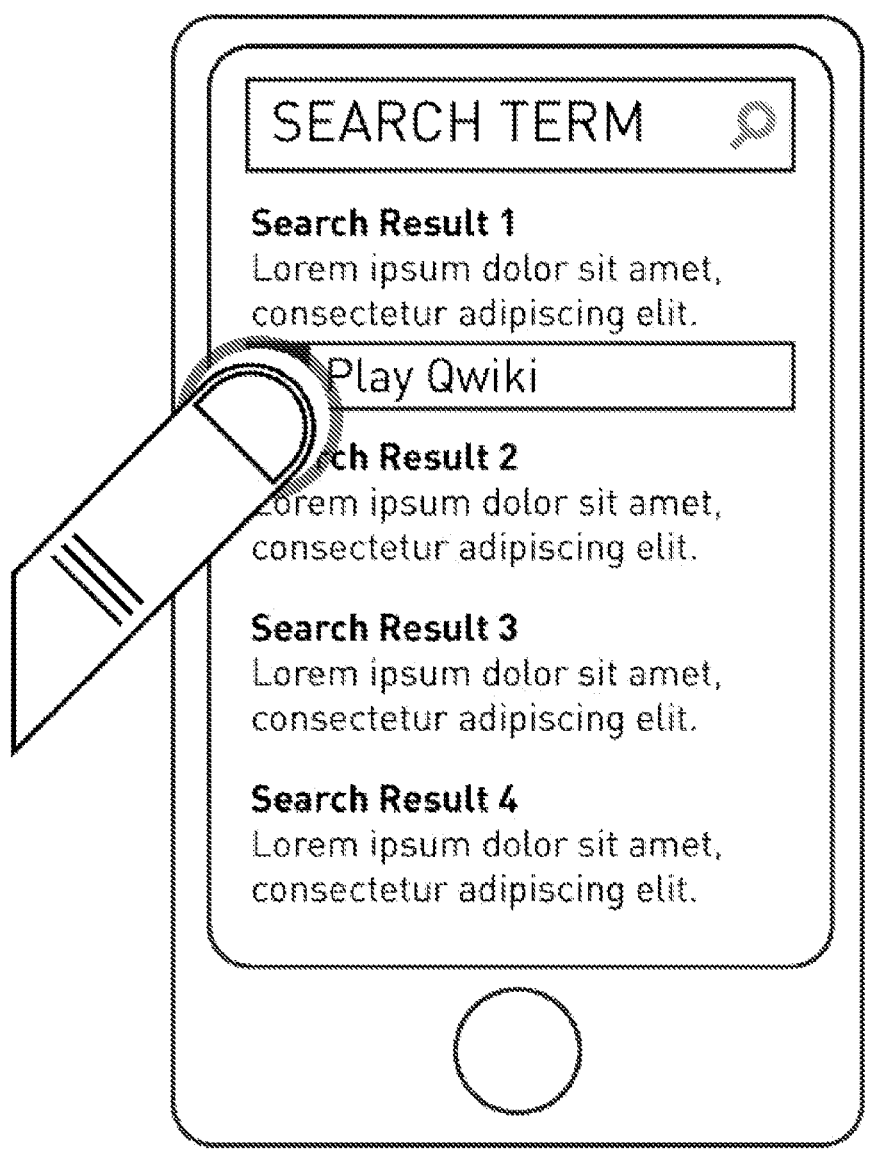
FIG. 3 is an illustration of an exemplary search engine results page showing user action with a mobile device display search results page consistent with certain aspects related to the innovations herein.

FIG. 3 is an illustration of the web page of FIG. 2 showing the integration of touch-enable functionality consistent with aspects of the innovations herein. In FIG. 3, a user is shown tapping the "Play Qwiki module" icon using their finger. Touch enabled screens allow such interaction with a stylus or other such device as well, while such features may be navigated with various cursor-based functionality, as well.

Figure 4:
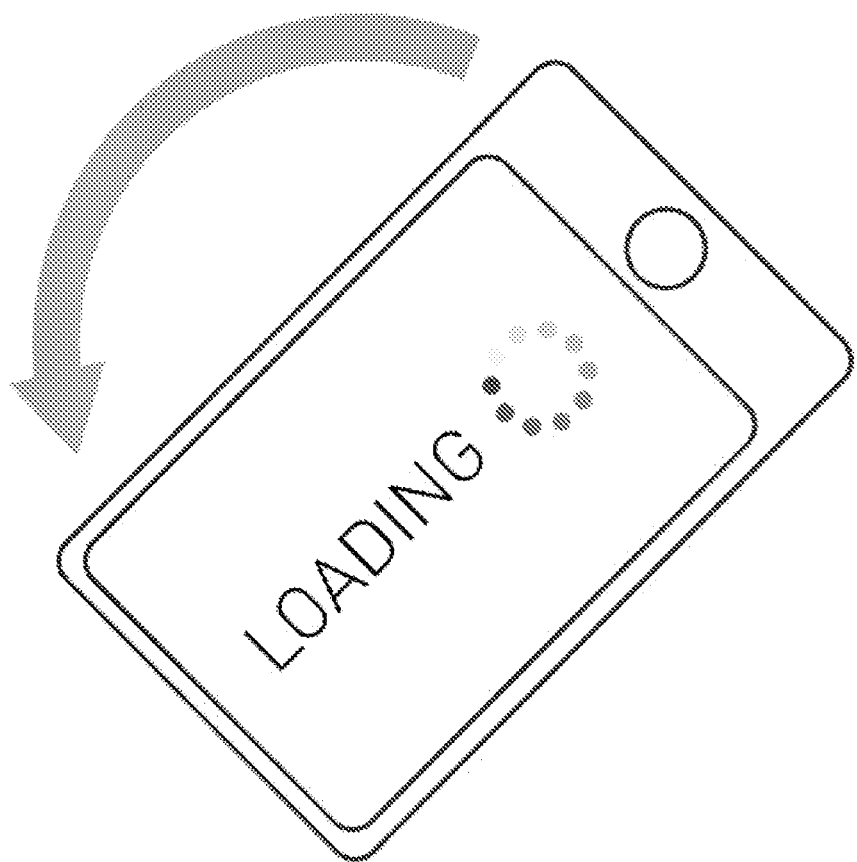
FIG. 4 is an exemplary screenshot illustrating further mobile device display functionality consistent with certain aspects related to the innovations herein.

FIG. 4 is an illustration of exemplary mobile device display and functionality consistent with aspects of the innovations herein. In the example of FIG. 4, the mobile smartphone may be rotated to initiate a specified function associated with mixed-media module creation and/or playing, or to transition between landscape display and portrait display, among other functions.

Figure 5:
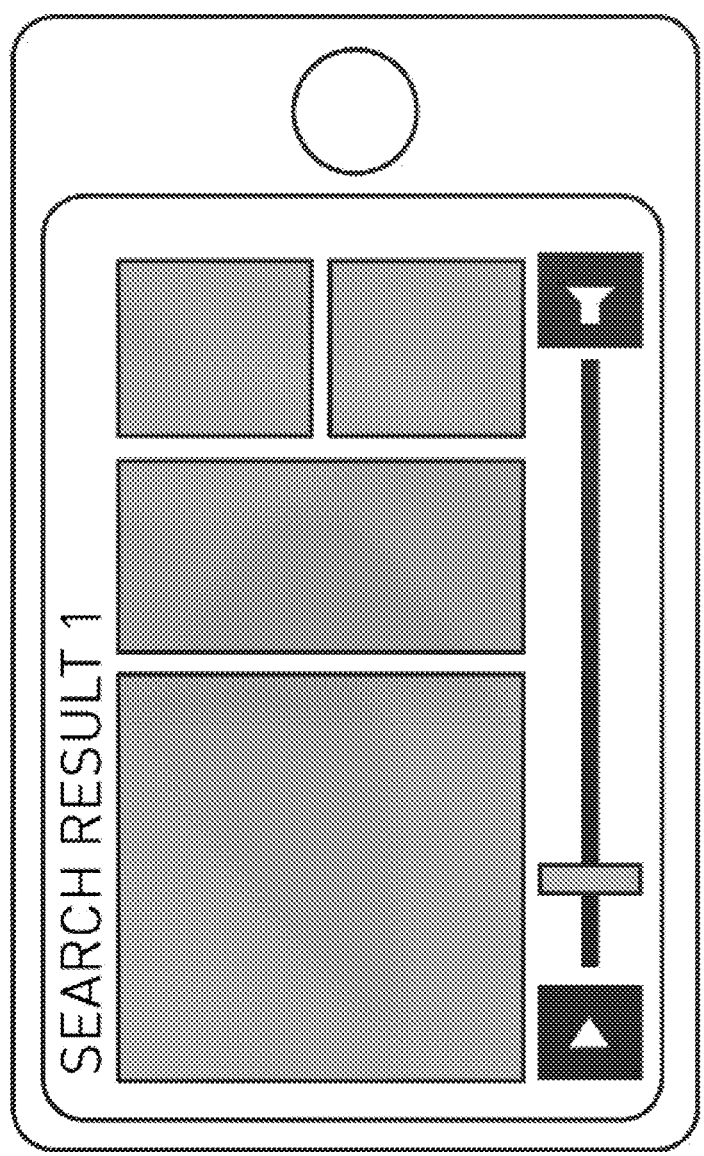
FIG. 5 is an exemplary screenshot illustrating mobile device display of a search results content such as a mixed-media module consistent with certain aspects related to the innovations herein.
Figure 6:
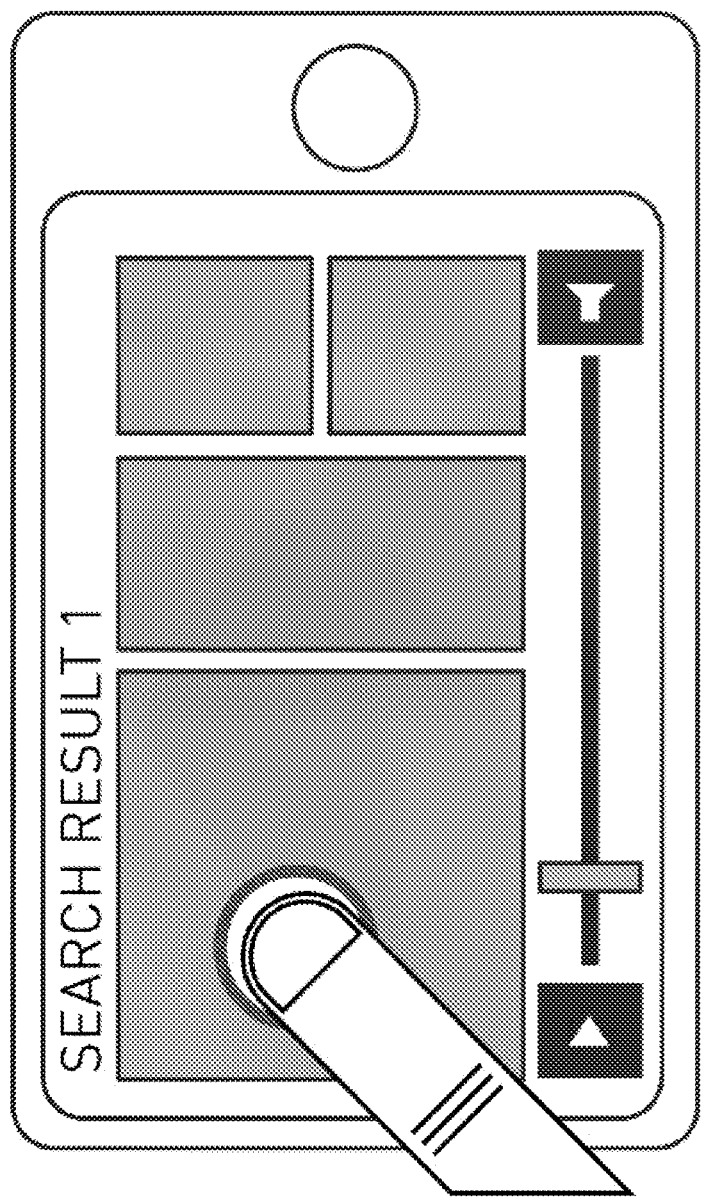
FIG. 6 is an exemplary screenshot of an illustrative mobile device display showing user interaction with a mixed-media module from the search results consistent with certain aspects related to the innovations herein.

FIG. 5 is an exemplary screenshot showing mobile device display of an illustrative mixed-media module consistent with certain aspects related to the innovations herein. FIG. 6 is an exemplary screenshot of an illustrative mobile device display showing user interaction with a mixed-media module from the web page consistent with certain aspects related to the innovations herein.

FIG. 6 shows a user interacting with a portion of the mixed-media module, here tapping the particular media or object with respect to which additional content (details, information, etc) or further functionality is desired. As set forth elsewhere herein, associated servers or engines may be configured to interoperate with such action in a variety of ways.

Figure 7:
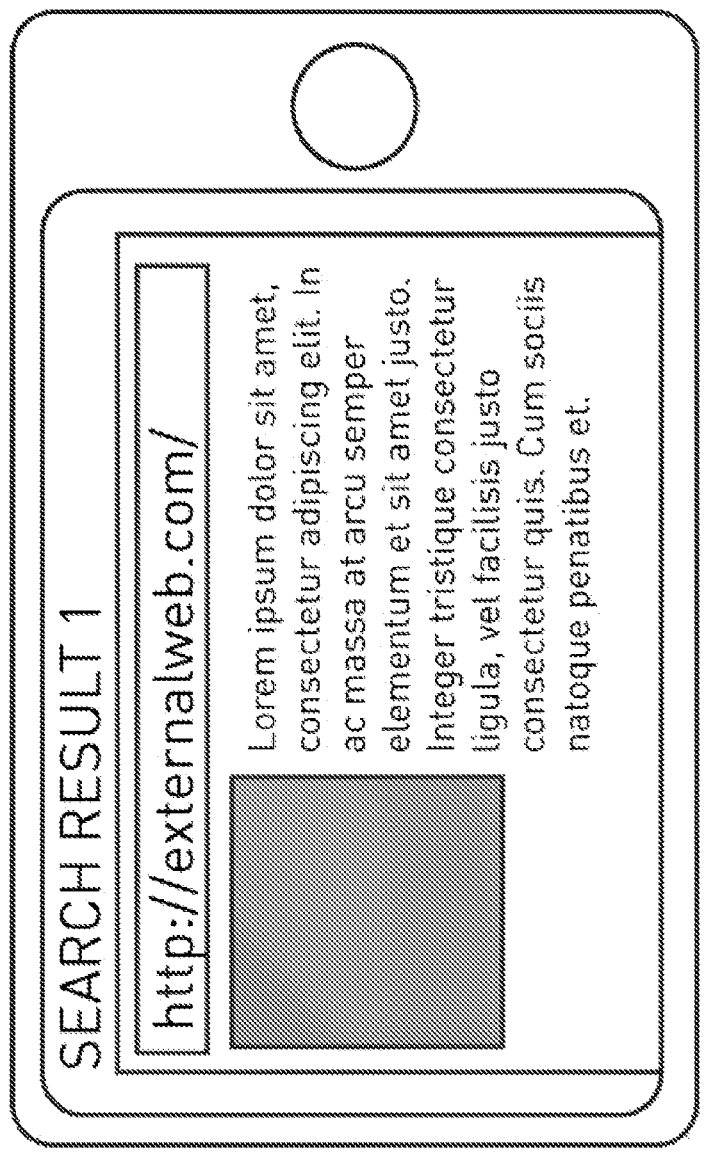
FIG. 7 is an exemplary screenshot of a mobile device display showing an illustrative result of a user interaction consistent with certain aspects related to the innovations herein.

FIG. 7 is an exemplary screenshot of a mobile device display showing an illustrative result of a user interaction consistent with certain aspects related to the innovations herein. Here, this example shows an illustrative re-direct associated with the tapped object to a particular web page. The result shows a multimedia text and image or video within the web page.

Turning to some more general aspects, an illustrative multimedia presentation herein may be configured as an interactive system of mixed-media/interactive content with clickable components. These mixed-media modules may also provides visual relevancy—the multimedia nature of such interactive component provides more in-depth detail of a topic than text alone.

In accordance with aspects of the present innovations, mixed-media module interactive summaries as integrated herein are lightweight—they use less bandwidth than pure video and are a rich, interactive, multi-media experience. Viewing such mixed-media module is faster and easier than video alone because they are interactive and have more discrete sets of contents that can easily be traversed beyond a simple play bar associated with most traditional video. Mixed-media modules herein also contain more information (meta-data) than video because of its multitude of components (mixed media), interactive nature and because of being configured to be interactive with users/viewers.

According to certain aspects, creator implementations allow an author to create interactive, meta-data rich, playable content for the web. These implementations are intuitive to use, thus demand only a low-learning curve. The creator is touch-enabled, such as via gestures (see below) for mobile devices and the interface is "drag and drop" for ease of use, as explained further below.

Easy coordination and timing of the audio and video tracks are other innovative features of the Creator. This includes a "talking head" narrator who can be filmed on a laptop or mobile phone camera. Because it is simple to time a "talking head" or narrator's voice with a visual, mixed-media presentation and there is no need to edit it in a complicated video timeline. Additionally, there are custom filters for the creation of special effects and graphics which are simple to use.

The drag-and-drop editing that makes the Creator easy to use also means that it is simple to grab photos and images from a mobile device or online photo sharing site. Another advantage to the Creator is that is can be used collaboratively, especially implementations stored in the cloud. Implementations are also easy to update and change at any point because the content isn't "locked in" (rendered) like video. In essence, an online content producer can create a professional looking presentation without the time and expense of video.

Unlike traditional video production (mixed-media modules herein are not video), the interactive component requires no lengthy production process or rendering time. It's much lighter weight than video because it uses up five times less bandwidth. The individual elements within a module are not hosted on the server of an author, instead the preview may be stored on local servers for guaranteed availability. The images and files may be linked to the original source. The Creator allows an author to link to content in its original location which solves storage problems and possibly helps preserve the owners copyright protection. The Creator also offers an animation platform that includes a custom graphics tool with no rendering issues as with traditional video. The processing of the animation is also off-loaded to device playing back the module which means precious bandwidth is preserved—this is especially valuable when playing on mobile devices.

Content creators can add depth to the narrative presentation in a way that is not possible with video. The module can be viewed as a linear story, but the embedded and coordinated links mean that the audience can self-select its path through the module. For example, there is currently no method for including hyperlinks with online video. The producer of a video cannot link to a partner site, get credit for referring customers to an ecommerce site or, simply, strengthen their content with references via hyperlinks. "Chaptering" is another technology that enhances the experience of creating and viewing a mixed-media module. The author can divide a Qwiki into chapters—something that is not easily possible with streaming video—and give the audience the ability to easily jump around and navigate through the content. The Creator gives an author the tools to do all of these things via editor tools, explained below.

The "choose your own adventure" style of viewing a module herein also means that advertising can be more sophisticated with such products. The path a viewer chooses through the hyperlinks can determine the type of advertising they see because it builds a consumption profile. Advertising can also be targeted more effectively as the author may have control over the types of advertising viewed by their audience. An ad suggestion engine may enhance the advertising experience for both the author and the audience. Ads in the modules herein are like the ads in a magazine—selected by the author or publisher to fit the audience and the adjacent content. The added context for these ads may result in a higher CPM for advertisers who will pay higher rates for better results and more targeted viewers. Also, the advertising can be integrated seamlessly without interrupting the viewing experience.

The Creator also potentially creates a new revenue stream for an author. If the author embeds a link to a site—perhaps a product that they recommend—and that click-through results in a sale, the author could get a sales commission or credit for that sale. These innovations make it much easier for an author to create a referral and get credit for that referral. This could work with all types of e-commerce ranging from catalogs to travel sites.

Another advantage to systems and methods herein is their cross-platform capabilities. Because the present implementations work across platforms it will result in the wider consumption of information on sites that contain a module. It has auto-resize for different screens and internet connections—it doesn't simply rely on compression—which results in a product that is more easily viewed. Mobile device users, in particular, will find it easier to view modules herein.

Qwiki's can include, but are not limited to, PDFs, images, video, documents, text, and other web pages. This becomes content based meta-data, not merely "tags." The Qwiki Creator is a vast improvement over online video because it "levels the playing field" when it comes to the creation of playable media. The Creator opens the door to almost anyone who wants to create playable, narrative content online without expensive equipment and steep learning curves. A low barrier to entry (i.e. time, money, skill-set) means that anyone with a story to tell and internet access—regardless of their resources—now has an authoring tool for multimedia communication. The Creator also provides better opportunities for SEO and the implementation of metadata on a website which is useful for anyone wishing to bolster their online presence in a way that is rich and engaging.

Figure 8:
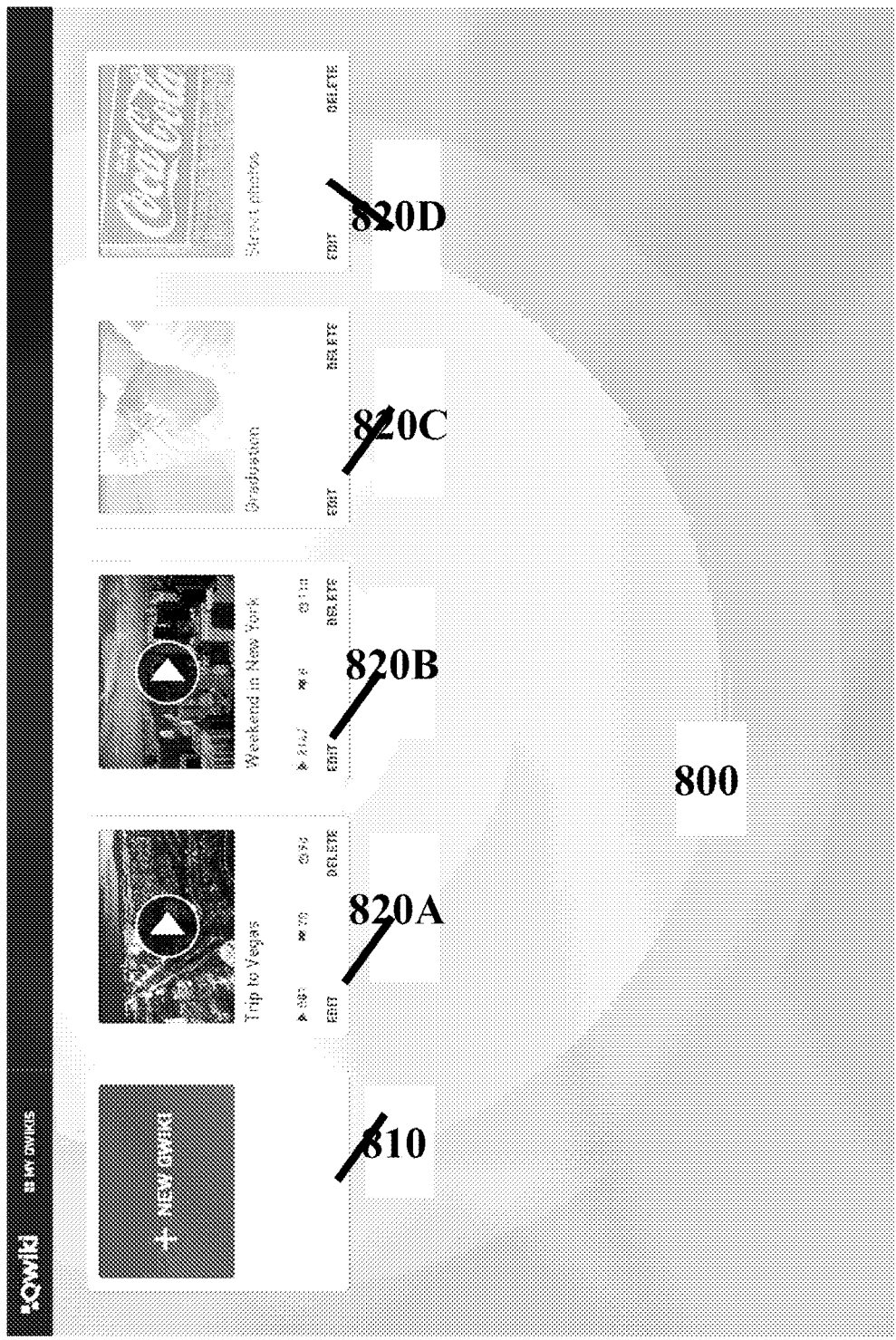
FIG. 8 is an illustration of a Mixed-Media Module creator dashboard consistent with certain aspects related to the innovations herein.

FIG. 8 is an illustration of a Mixed-Media Module creator dashboard consistent with certain aspects related to the innovations herein. Referring to FIG. 8, the dashboard 800 may comprise icons (options) such as creating a new Mixed-Media Module 810, and a list of existing Mixed-Media Modules 820A, 820B, 820C, 820D, among other items and options set forth below.

Figure 9:
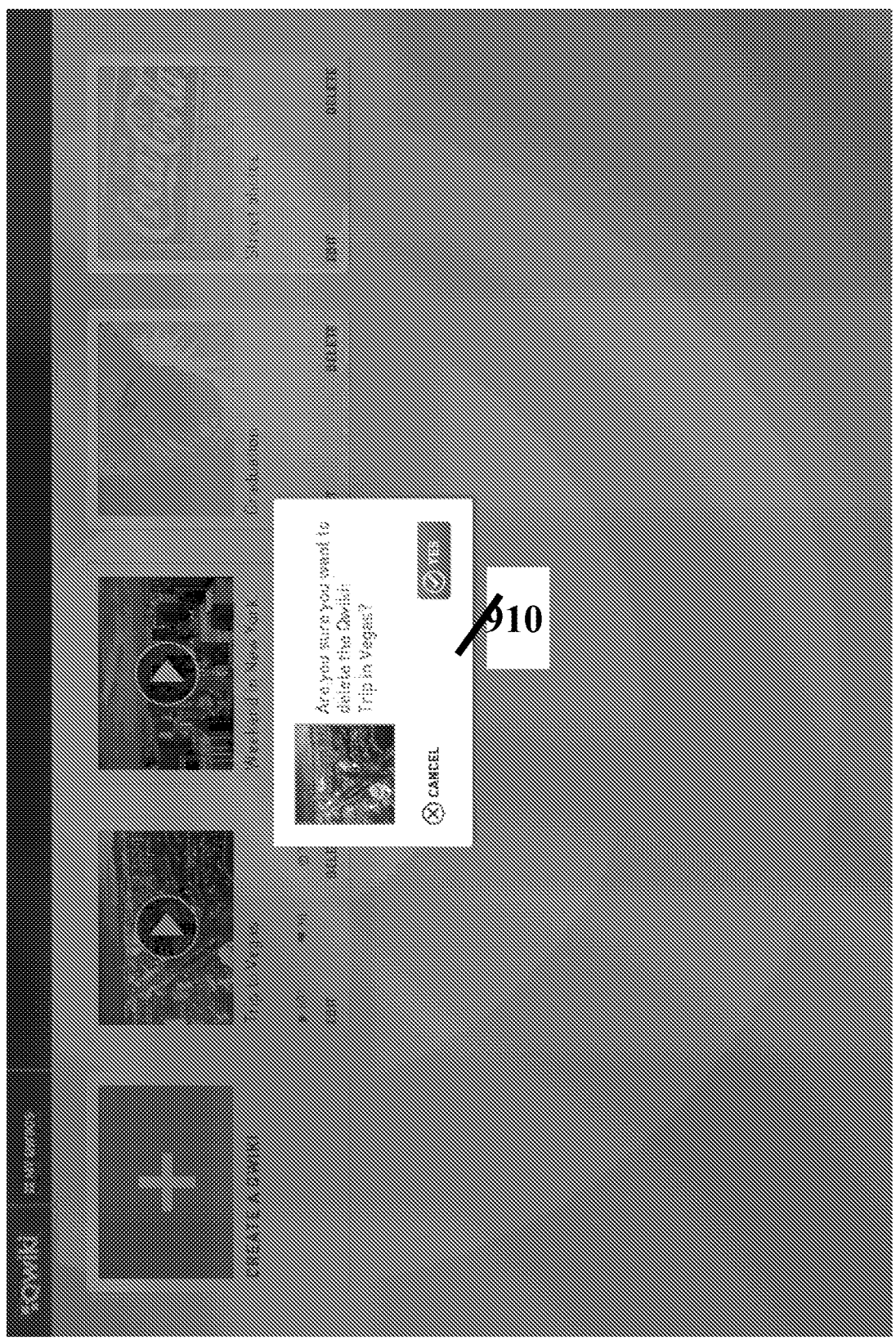
FIG. 9 is an illustration of a Mixed-Media Module creator showing aspects of removing a module consistent with certain aspects related to the innovations herein.

FIG. 9 is an illustration of a Mixed-Media Module creator showing aspects of removing a module consistent with certain aspects related to the innovations herein. Referring to FIG. 9, users are able to remove Mixed-Media Modules by clicking a delete button. This, for example, could prompt a notification 910 for the user to confirm deletion of a Mixed-Media Module.

Figure 10:
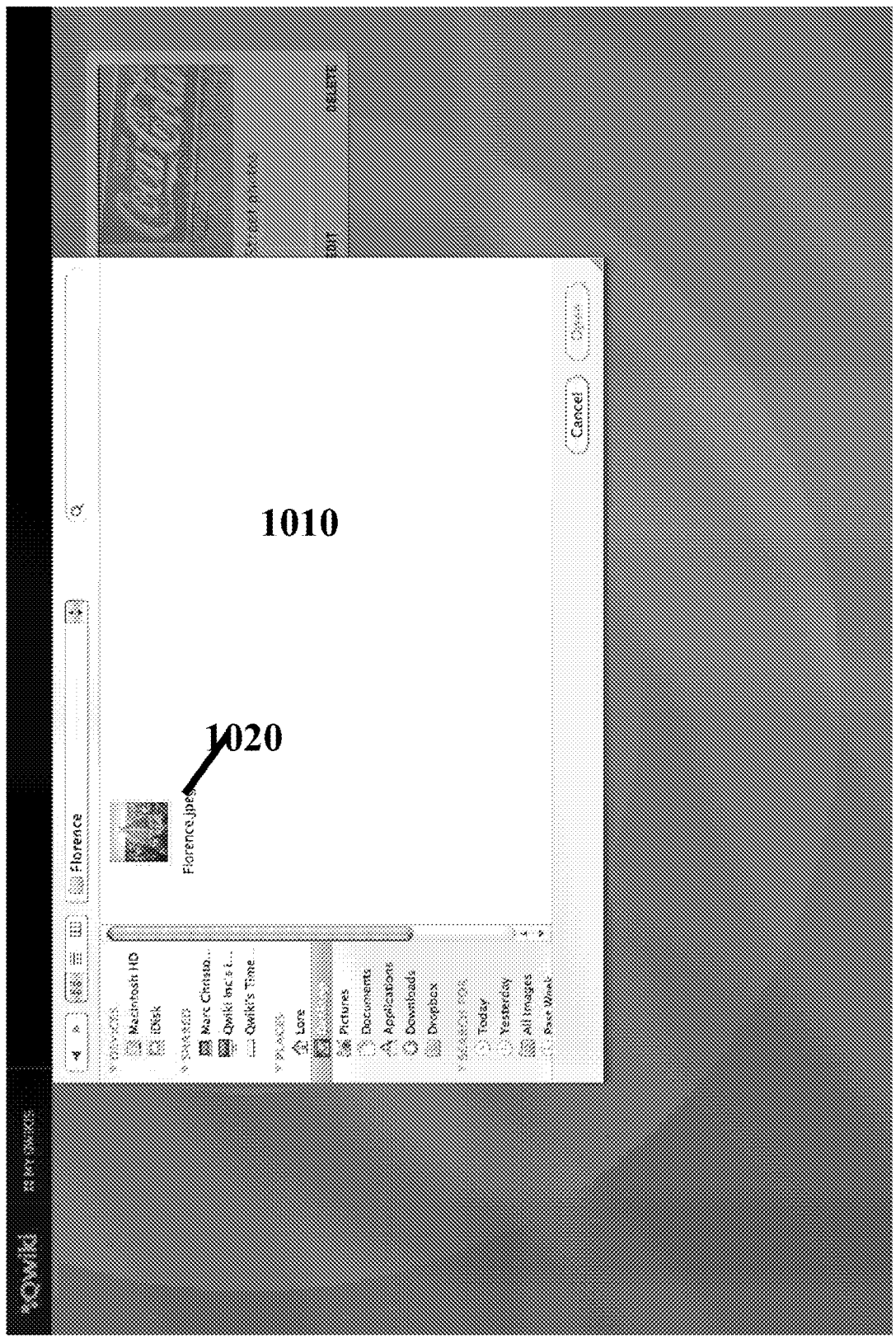
FIG. 10 is an illustration of a Mixed-Media Module creator showing aspects of creating a module consistent with certain aspects related to the innovations herein.

FIG. 10 is an illustration of a Mixed-Media Module creator showing aspects of creating a module consistent with certain aspects related to the innovations herein. Referring to FIG. 10 the module is created via the navigation window 1010 that allows a user to organize and manage the Mixed-Media Module files 1020.

Figure 11:
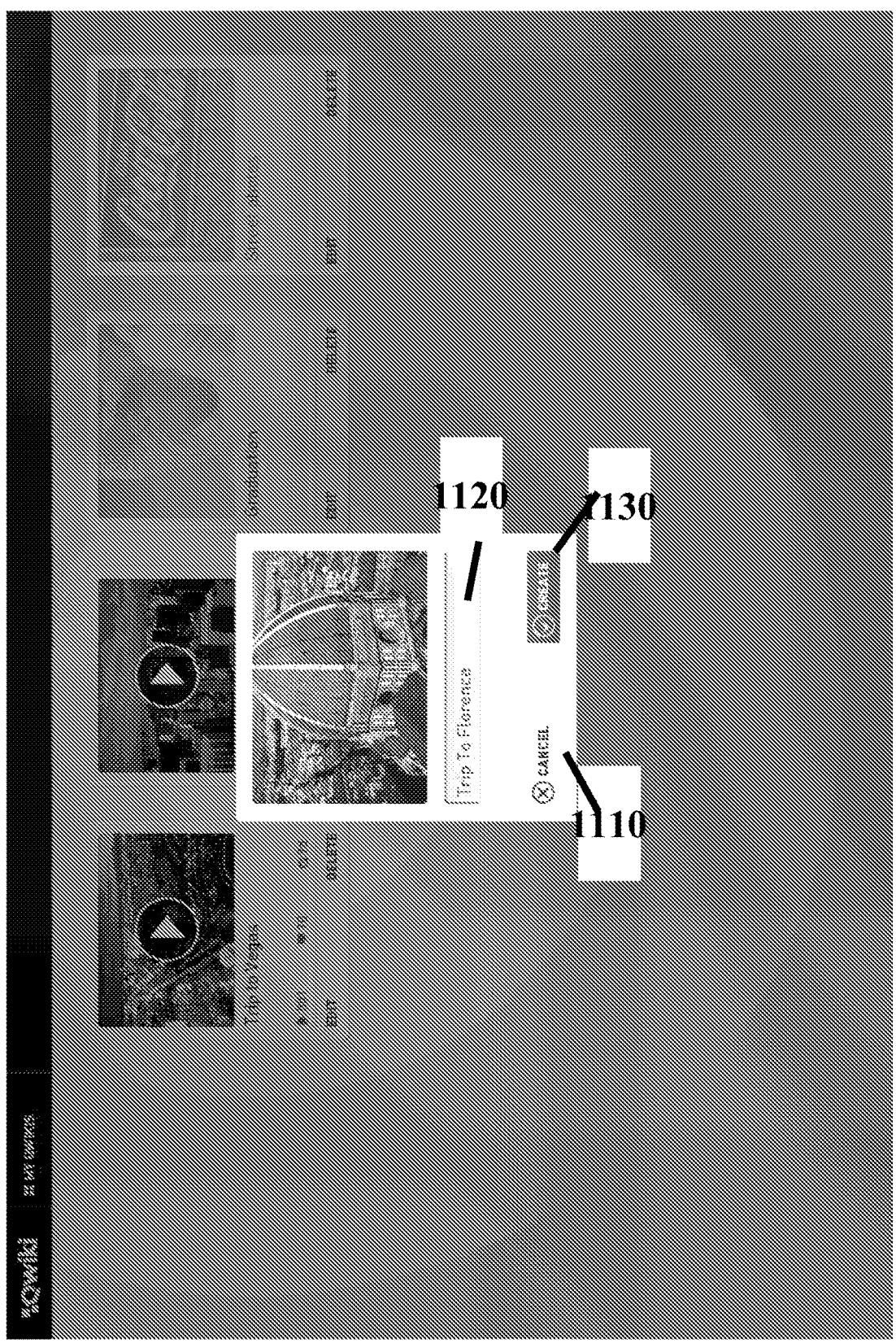
FIG. 11 is another illustration of a Mixed-Media Module creator showing aspects of creating a module consistent with certain aspects related to the innovations herein.

FIG. 11 is another illustration of a Mixed-Media Module creator showing aspects of creating a module consistent with certain aspects related to the innovations herein. Referring to FIG. 11, once the file is selected, the Mixed-Media Module could show an icon 1110 with a place to name the file 1120 and select "create" button 1130. This, for example, could launch the creation of the Mixed-Media Module substance.

Figure 12:
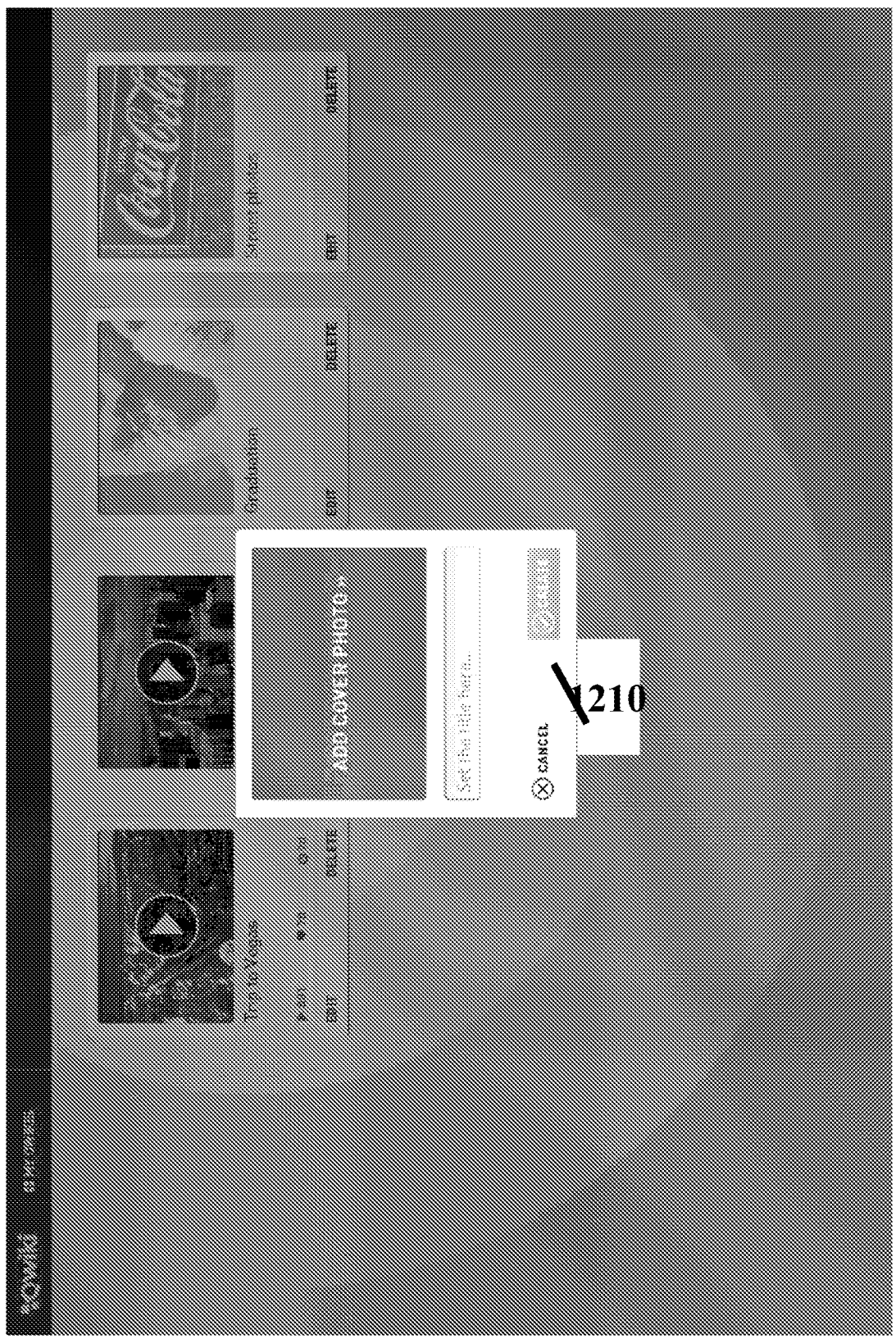
FIG. 12 is another illustration of a Mixed-Media Module creator showing aspects of creating a module consistent with certain aspects related to the innovations herein.

FIG. 12 is another illustration of a Mixed-Media Module creator showing aspects of creating a module consistent with certain aspects related to the innovations herein. Referring to FIG. 12, the user can add a cover photo and set the title, 1210 to the Mixed-Media Module.

Figure 13:
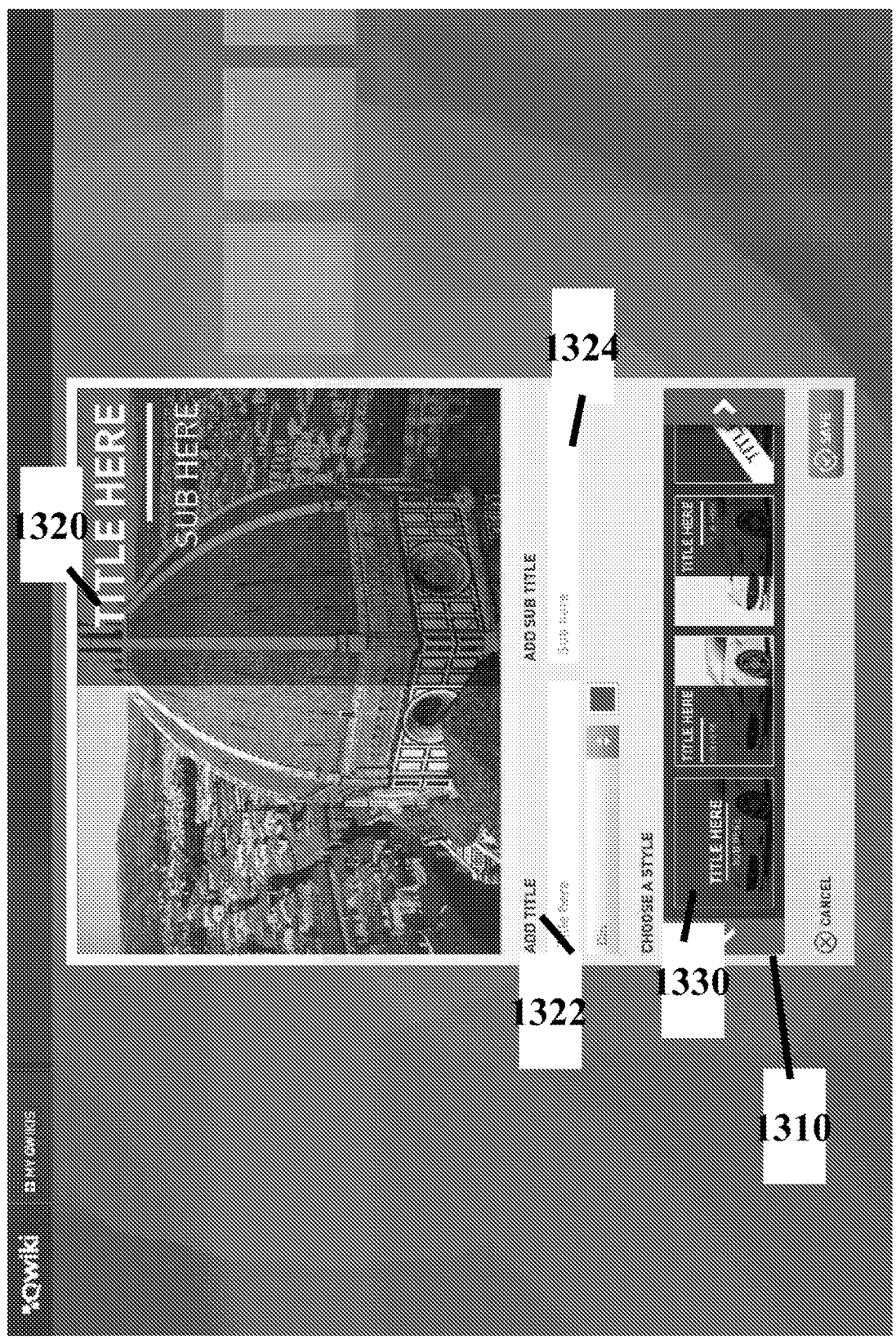
FIG. 13 is another illustration of a Mixed-Media Module creator showing aspects of creating a title card consistent with certain aspects related to the innovations herein.

FIG. 13 is another illustration of a Mixed-Media Module creator showing aspects of creating a title card consistent with certain aspects related to the innovations herein. Referring to FIG. 13, the Mixed-Media Module creation window 1310, allows users to edit different portions of the module. The title section 1320 reflects the title 1322 and subtitle 1324 entry boxes. Further, the style selection bar 1330 could allow users to pick a style for the Mixed-Media Module.

Figure 14:
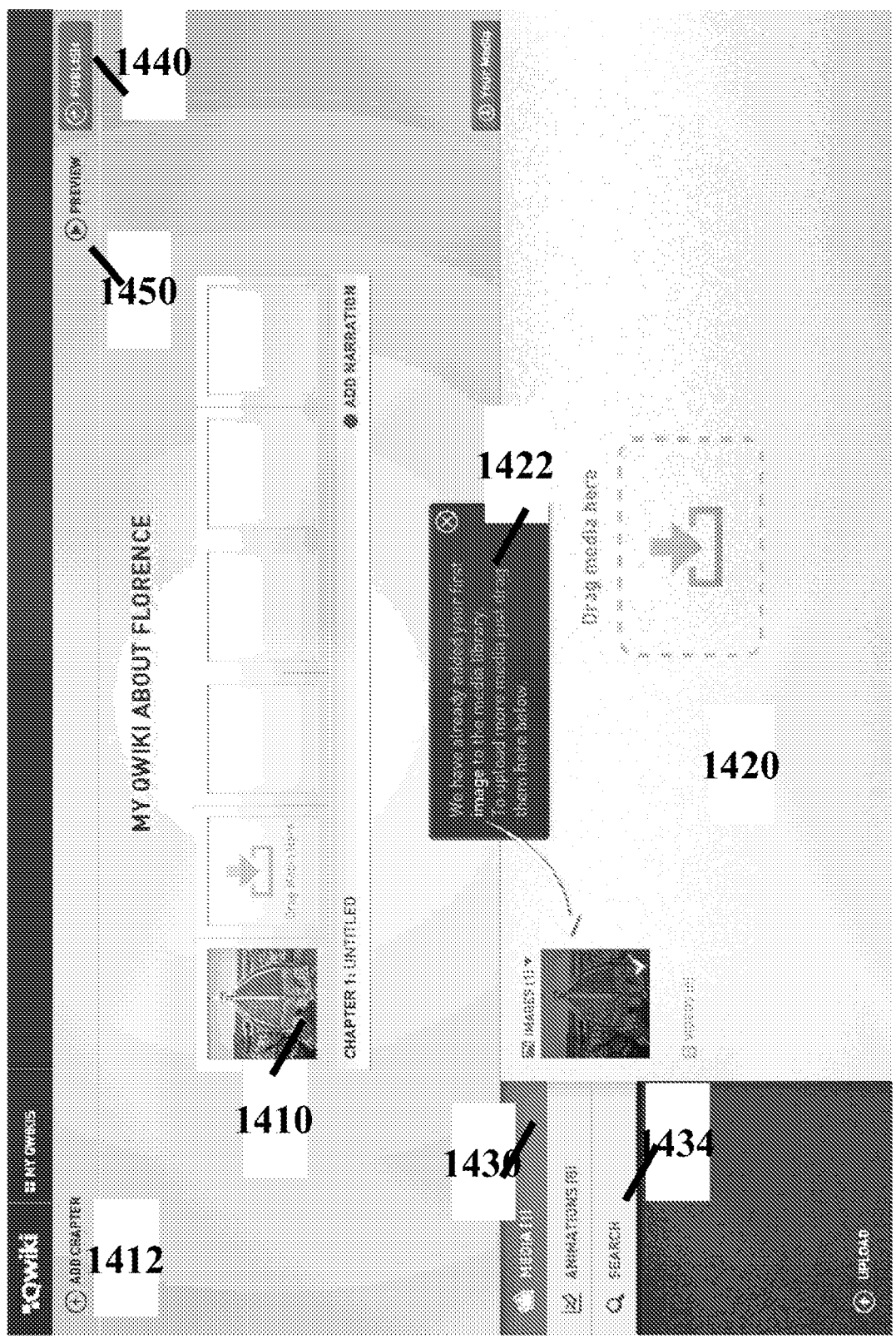
FIG. 14 is another illustration of a Mixed-Media Module creator showing aspects of creating a media library for the first time consistent with certain aspects related to the innovations herein.

FIG. 14 is another illustration of a Mixed-Media Module creator showing aspects of creating a media library for the first time consistent with certain aspects related to the innovations herein. Referring to FIG. 14, the media timeline section 1410 can reflect the order of the media that is organized from the general media selection area 1420 in the library. The system can notify the user, as in this example, that the image selected has been added to the library, through a notification bubble 1422. Any media files can be dragged and dropped into this media selection area 1420 for use in the Mixed-Media Module.

Continuing with FIG. 14, the chapters can be added to via an add chapter button 1412 to designate different subtopics in the Mixed-Media Module. Further, the general media selection area of the library 1420 shows the different media files that are to be arranged in the timeline above 1410. Once completed, the user can select the "publish" 1440 or "preview" 1450 buttons in this example, to see their Module play. Also, the updates bar 1430 shows how many media files, animation files, and other files have been associated with this Mixed-Media Module. There is also a search button 1434 that allows users to search through files to decide to drag them to the general media selection section 1420.

Figure 15:
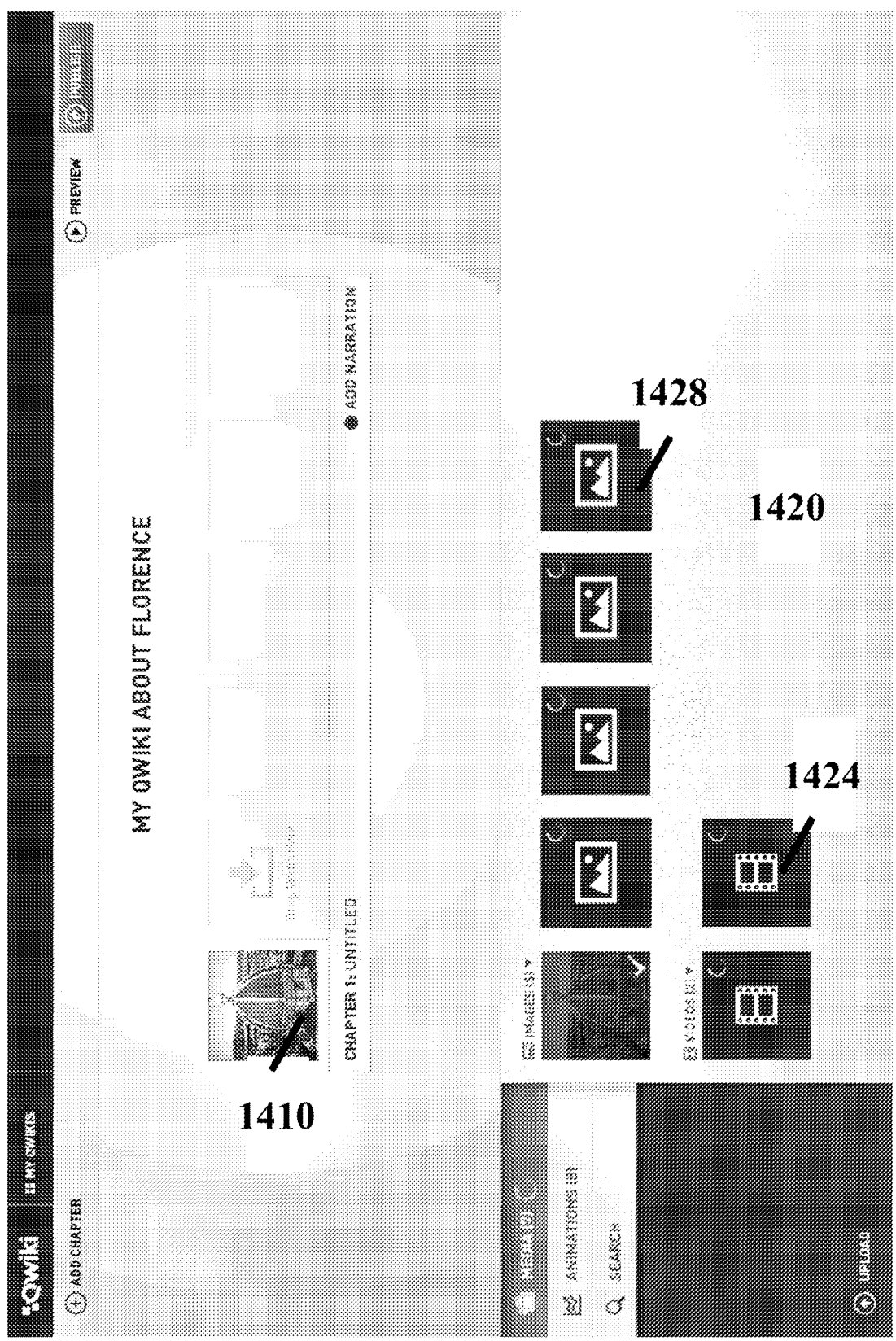
FIG. 15 is another illustration of a Mixed-Media Module creator showing aspects of media library uploading implementations consistent with certain aspects related to the innovations herein.

FIG. 15 is another illustration of a Mixed-Media Module creator showing aspects of media library uploading implementations consistent with certain aspects related to the innovations herein. Referring to FIG. 15, the timeline 1410 reflects what media has been included by the user. The video 1528 and images 1524 are shown in this example, in the general media selection section library 1420. The files are shown in a "loading" mode, as they are uploaded to the system, with an icon instead of the preview of media.

Figure 16:
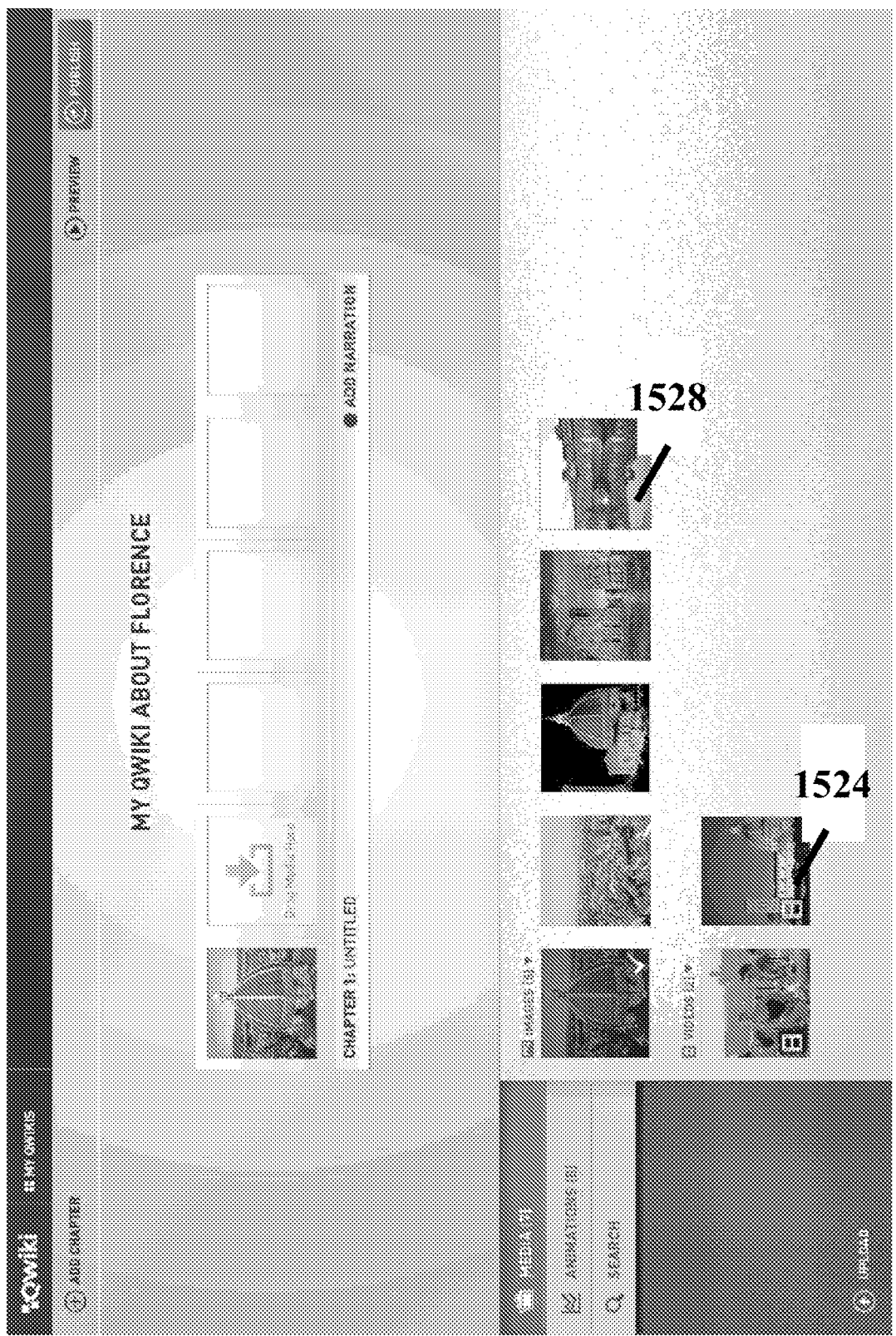
FIG. 16 is another illustration of a Mixed-Media Module creator showing aspects of example media library implementations, where the library is full, consistent with certain aspects related to the innovations herein.

FIG. 16 is another illustration of a Mixed-Media Module creator showing aspects of example media library implementations, where the library is full, consistent with certain aspects related to the innovations herein. Referring to FIG. 16, the files, once loaded, are shown in the video bar 1524 and images bar 1528. These files, in this example, are shown with a preview f the media in their icon, after they have fully loaded and are ready for implementation into the Mixed-Media Module timeline.

Figure 17:
FIG. 17 is another illustration of a Mixed-Media Module creator showing aspects of example media library implementations, where the library is off, consistent with certain aspects related to the innovations herein.

FIG. 17 is another illustration of a Mixed-Media Module creator showing aspects of example media library implementations, where the library is off, consistent with certain aspects related to the innovations herein. Referring to FIG. 17, the library is not shown in this example display. The media timeline section 1410 is shown without the other files, not loaded.

Figure 18:
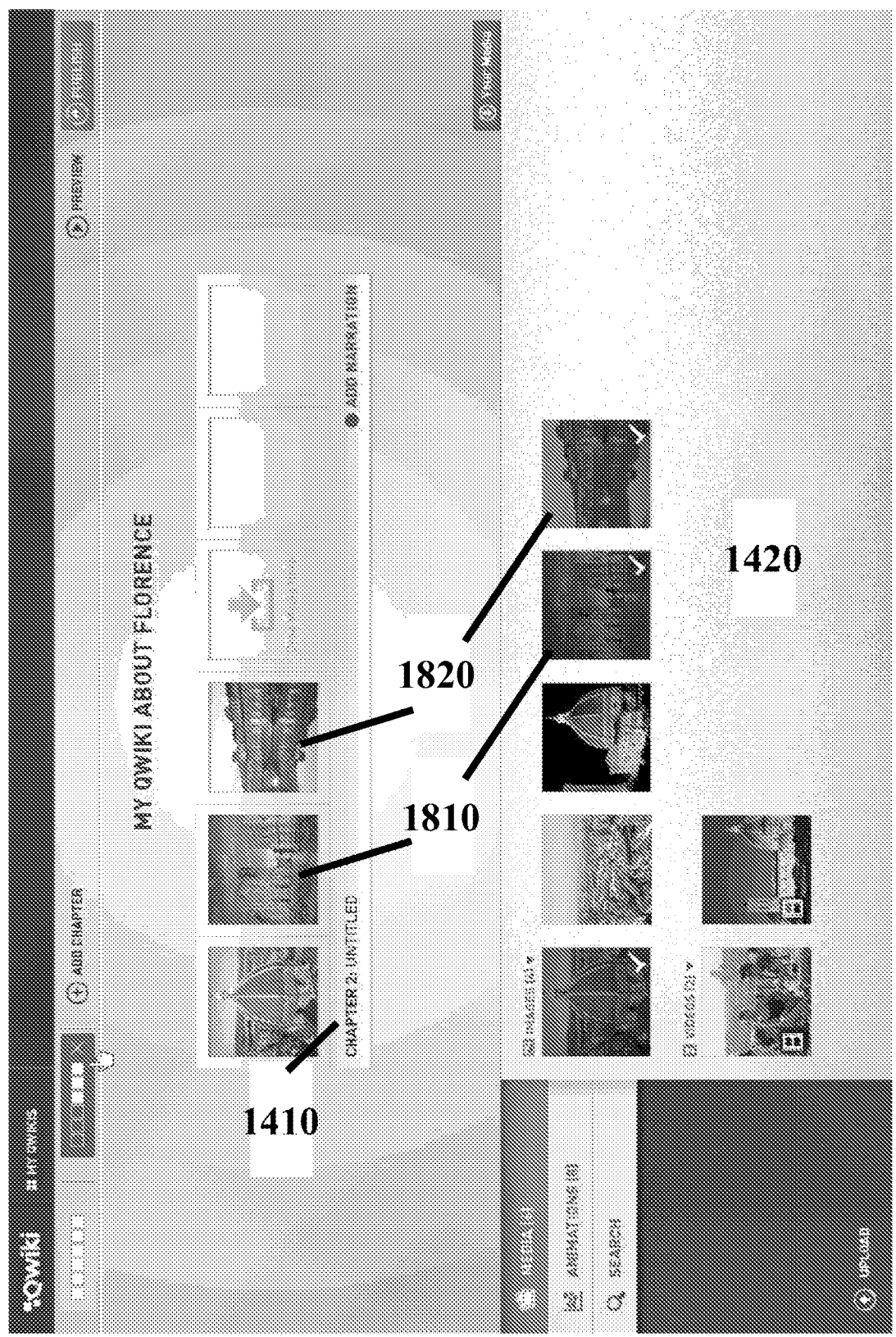
FIG. 18 is another illustration of a Mixed-Media Module creator showing aspects of example chapter 2 hover implementations consistent with certain aspects related to the innovations herein.

FIG. 18 is another illustration of a Mixed-Media Module creator showing aspects of example chapter 2 hover implementations consistent with certain aspects related to the innovations herein. Referring to FIG. 18, the library again shows that files loaded into the general selection section 1420, are included in the Mixed-Media Module and those that are not. For example, the image 1810 happens to be loaded into the timeline 1410. So is image 1820. Therefore, they are reflected both in the timeline 1410 and in the general selection area 1420 but there, with a check mark or other indication, acknowledging that it is included in the final presentation.

Figure 19:
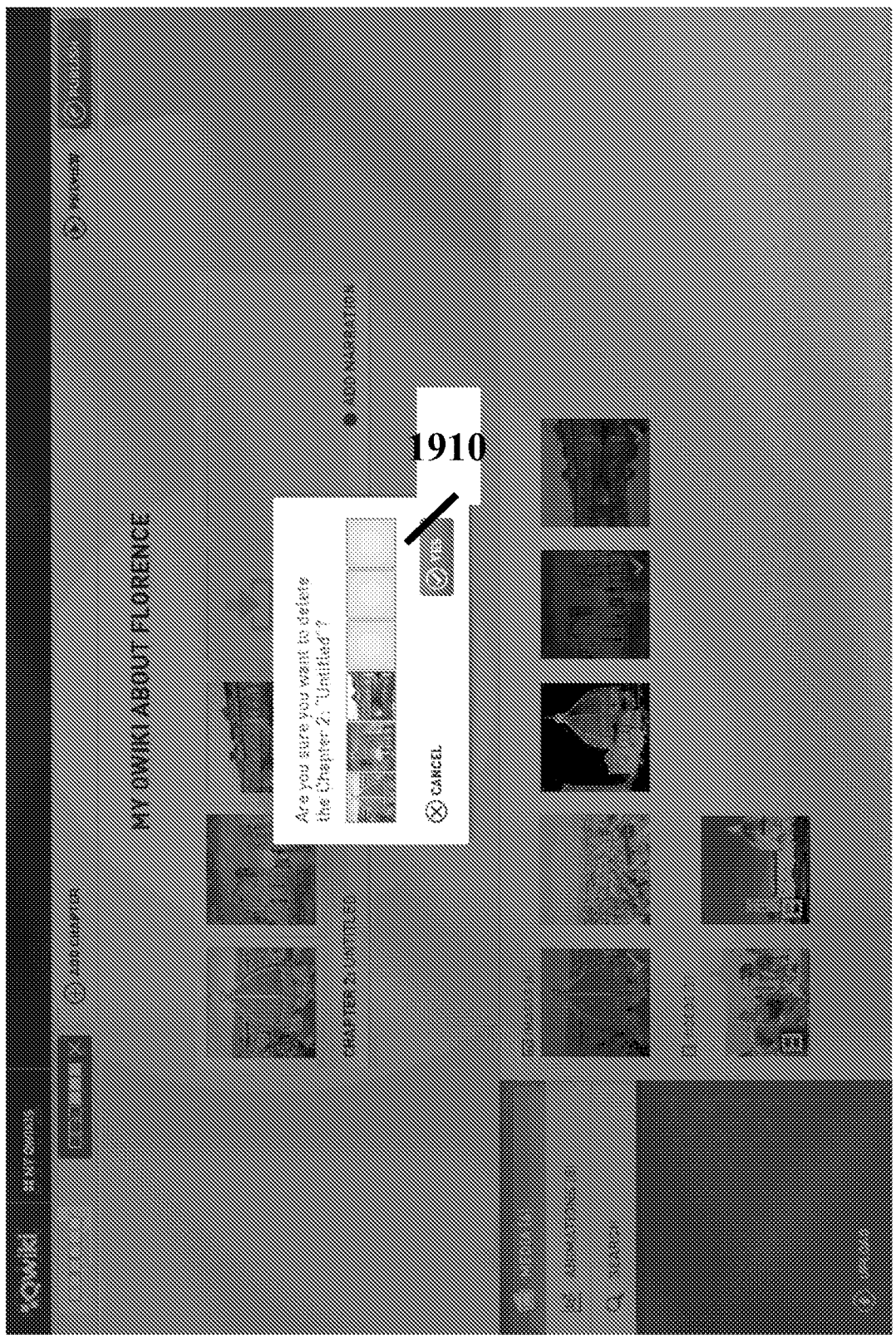
FIG. 19 is another illustration of a Mixed-Media Module creator showing aspects of example remove chapter implementations consistent with certain aspects related to the innovations herein.

FIG. 19 is another illustration of a Mixed-Media Module creator showing aspects of example remove chapter implementations consistent with certain aspects related to the innovations herein. Referring to FIG. 19, the user is able to remove a chapter if so desired. A prompt 1910 can be displayed to ensure that the user knows what they are attempting to delete, and to confirm or cancel that deletion.

Figure 20:
FIG. 20 is another illustration of a Mixed-Media Module creator showing aspects of example chapter 2 implementations consistent with certain aspects related to the innovations herein.

FIG. 20 is another illustration of a Mixed-Media Module creator showing aspects of example chapter 2 implementations consistent with certain aspects related to the innovations herein.

Referring to FIG. 20, the Mixed-Media Module can include multiple chapters. In FIG. 20, a second chapter is shown and indicated in the chapter selection bar 2010.

Figure 21:
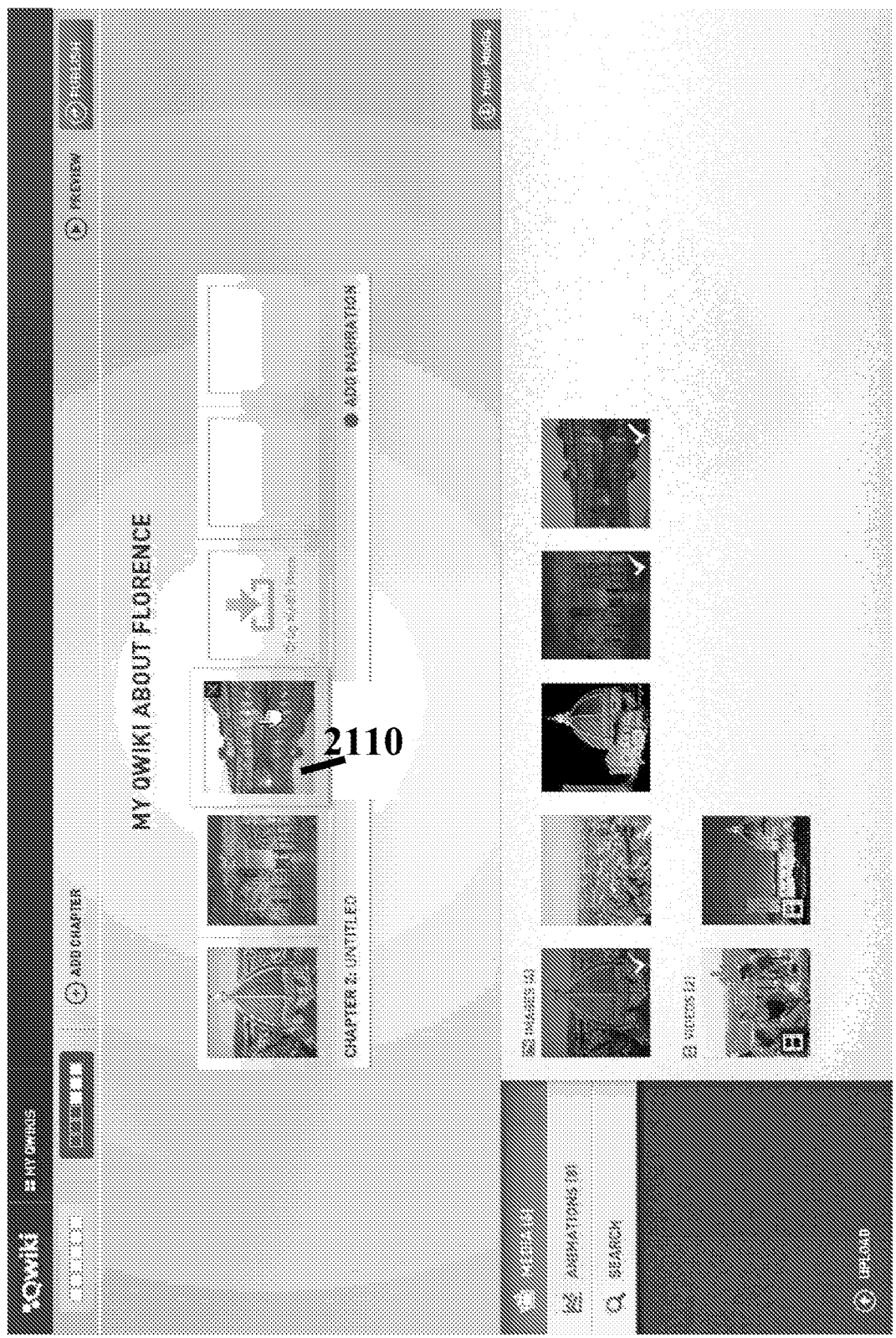
FIG. 21 is another illustration of a Mixed-Media Module creator showing aspects of example element mouse hover implementations consistent with certain aspects related to the innovations herein.

FIG. 21 is another illustration of a Mixed-Media Module creator showing aspects of example element mouse hover implementations consistent with certain aspects related to the innovations herein. Referring to FIG. 21, the user can hover the mouse or pointer or tap selector over a portion of the timeline 2110 and that portion can be selected.

Figure 22:
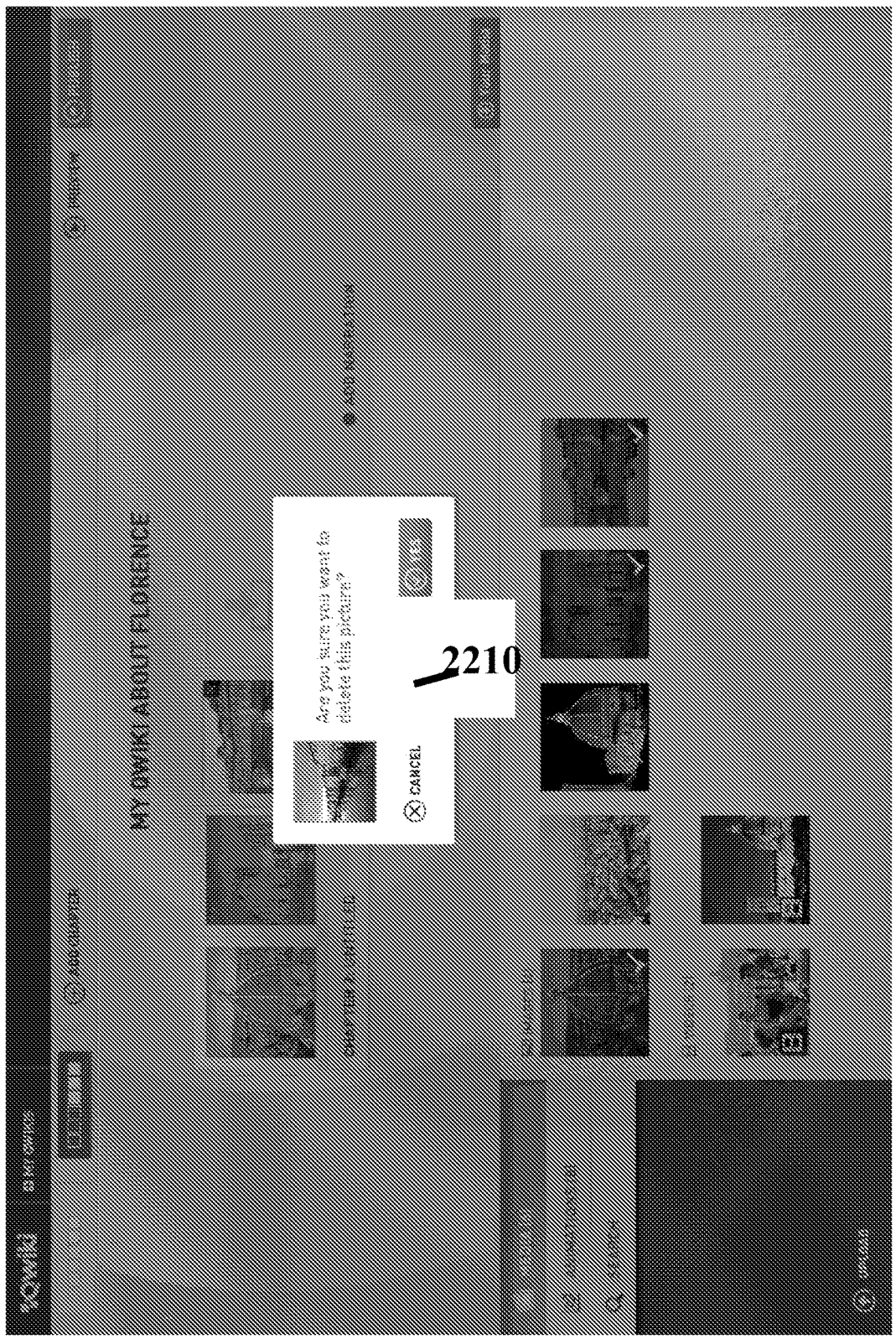
FIG. 22 is an illustration of a Mixed-Media Module creator showing aspects of example remove single image implementations consistent with certain aspects related to the innovations herein.

FIG. 22 is an illustration of a Mixed-Media Module creator showing aspects of example remove single image implementations consistent with certain aspects related to the innovations herein. Referring to FIG. 22, the user has decided to delete this picture, after selecting in as shown in FIG. 21. Next, a prompt appears 2210 to confirm that the user wishes to select the file, in this case an image, for deletion.

Figure 23:
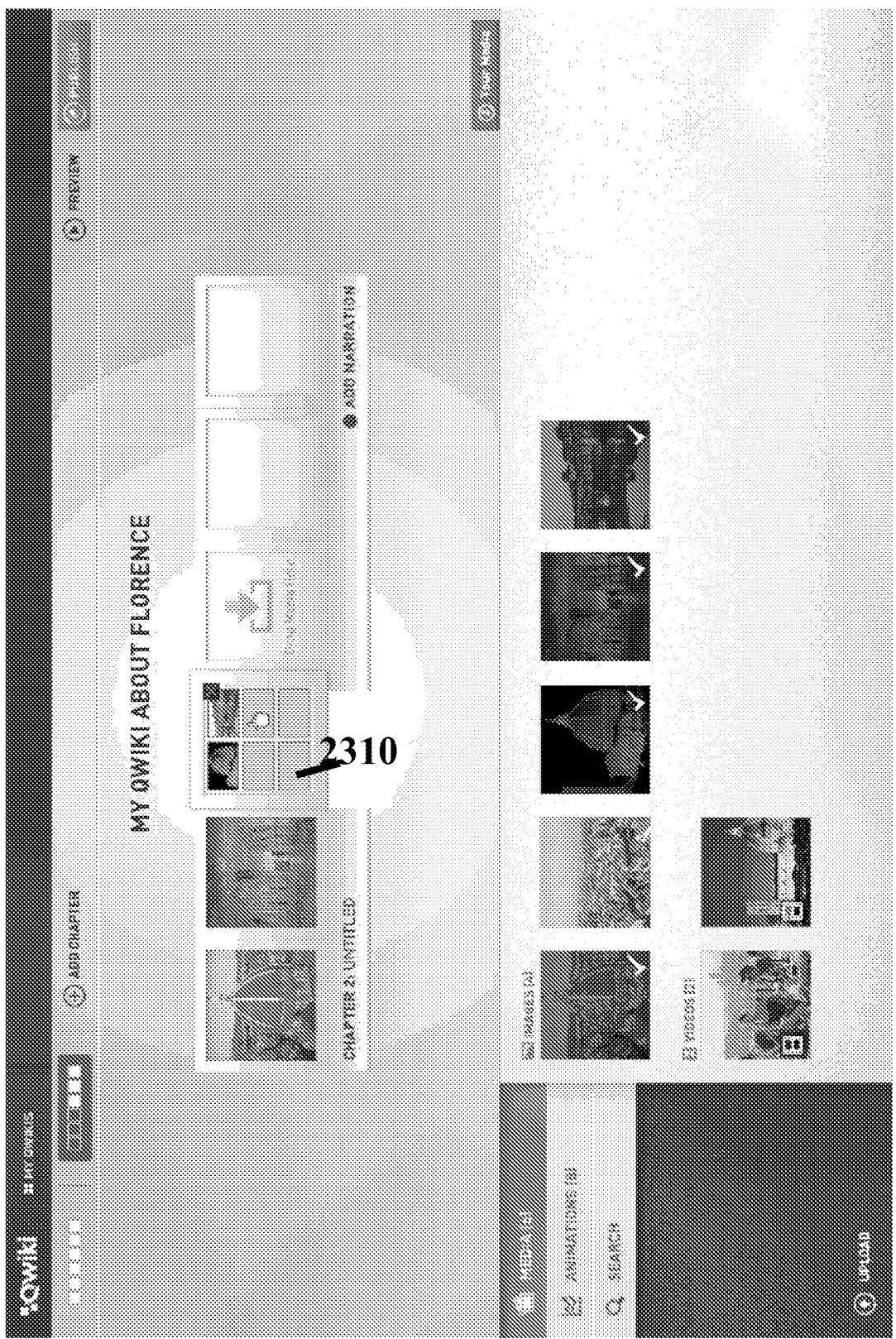
FIG. 23 is an illustration of a Mixed-Media Module creator showing aspects of example visual list mouse hover implementations consistent with certain aspects related to the innovations herein.

FIG. 23 is an illustration of a Mixed-Media Module creator showing aspects of example visual list mouse hover implementations consistent with certain aspects related to the innovations herein. Referring to FIG. 23, the user can hover the mouse or pointer or tap selector, over an image and a visual list will appear 2310.

Figure 24:
FIG. 24 is an illustration of a Mixed-Media Module creator showing aspects of example visual list implementations consistent with certain aspects related to the innovations herein.

FIG. 24 is an illustration of a Mixed-Media Module creator showing aspects of example visual list implementations consistent with certain aspects related to the innovations herein. Referring to FIG. 24, after the user selected an image in a visual list 2410.

Figure 25:
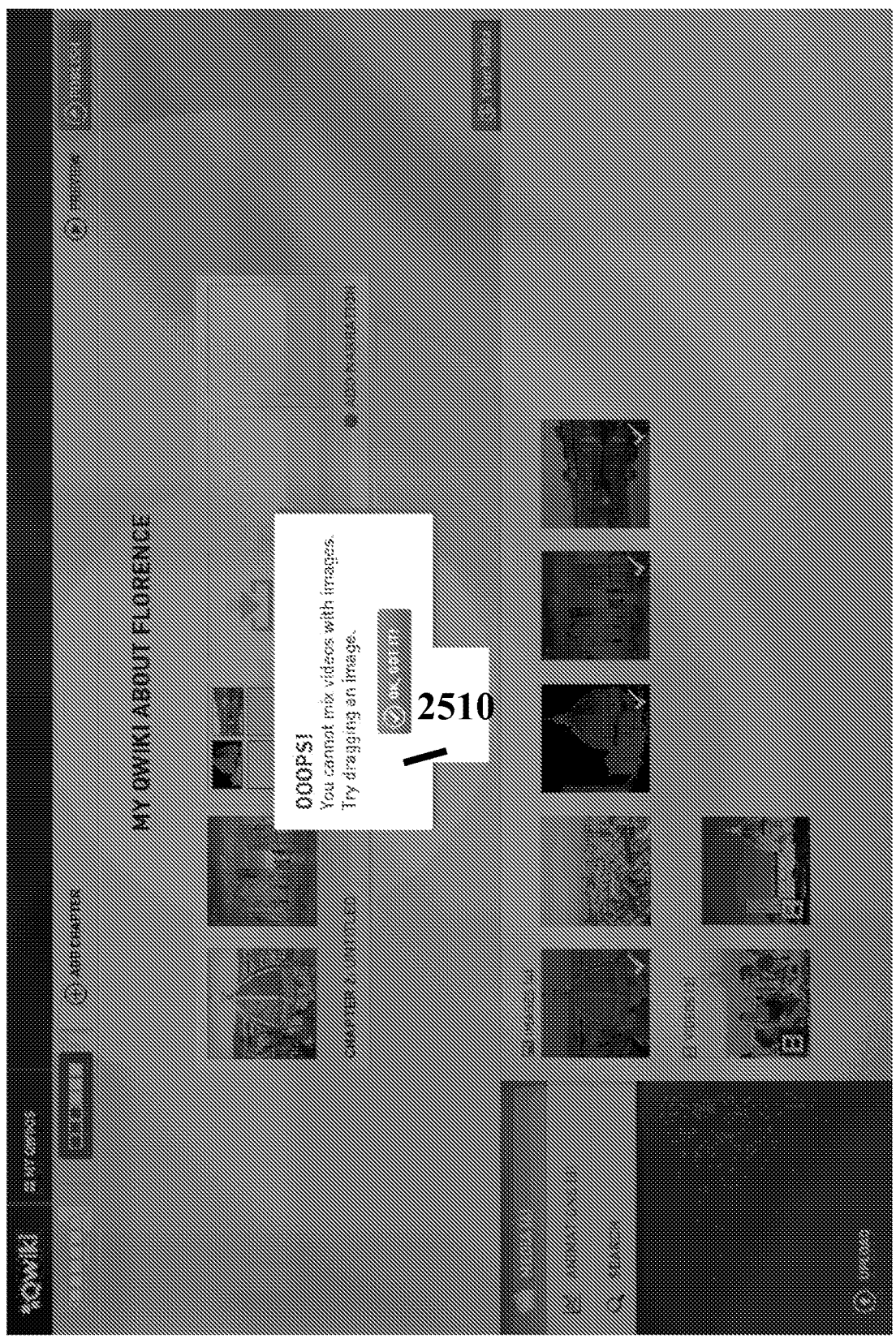
FIG. 25 is an illustration of a Mixed-Media Module creator showing aspects of example generic error wrong mix implementations consistent with certain aspects related to the innovations herein.

FIG. 25 is an illustration of a Mixed-Media Module creator showing aspects of example generic error wrong mix implementations consistent with certain aspects related to the innovations herein. Referring to FIG. 25, the system rejected the attempt to mix an image and video in the same portion, for example. The error notification box 2510, explains this to the user. Any number of errors could be conveyed in a similar manner.

Figure 26:
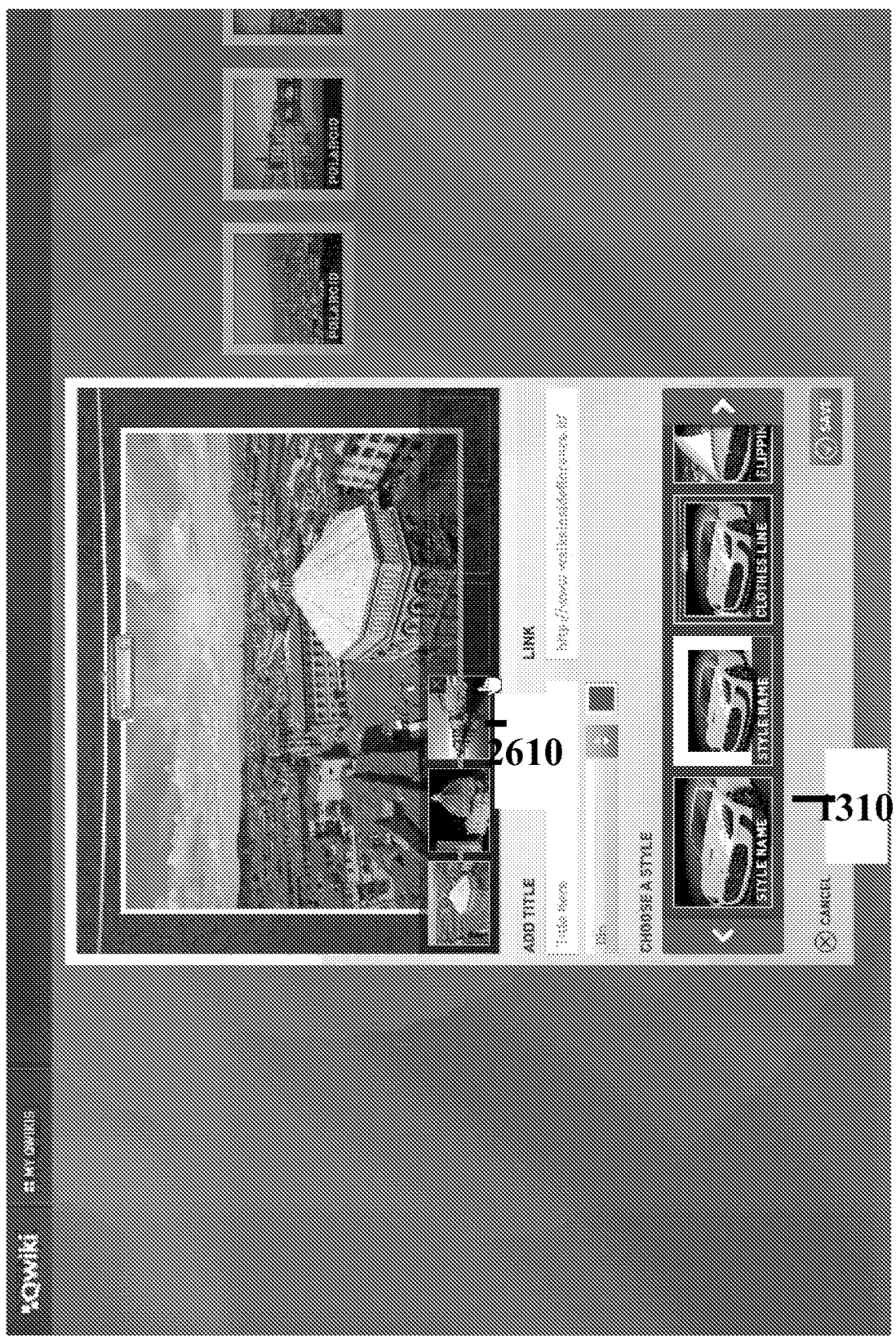
FIG. 26 is an illustration of a Mixed-Media Module creator showing aspects of attributes of example screen mouse hover implementations consistent with certain aspects related to the innovations herein.

FIG. 26 is an illustration of a Mixed-Media Module creator showing aspects of attributes of example screen mouse hover implementations consistent with certain aspects related to the innovations herein. Referring to FIG. 26, the Mixed-Media Module creation window 1310 shows the Mixed-Media Module creation progress. Further, the media timeline bar 2610 shows the different media uploaded and ordered in the current presentation. The user in FIG. 26 is hovering the mouse or pointer or tap selector over one particular media portion 2620 which highlights that portion, and allows for a user to delete the portion via the "x" in the corner.

Figure 27:
FIG. 27 is an illustration of a Mixed-Media Module creator showing aspects of attributes of example screen write caption implementations consistent with certain aspects related to the innovations herein.

FIG. 27 is an illustration of a Mixed-Media Module creator showing aspects of attributes of example screen write caption implementations consistent with certain aspects related to the innovations herein. Referring to FIG. 27, the user is also able to add a caption to each individual media portion through a media screen write window 2710.

Figure 28:
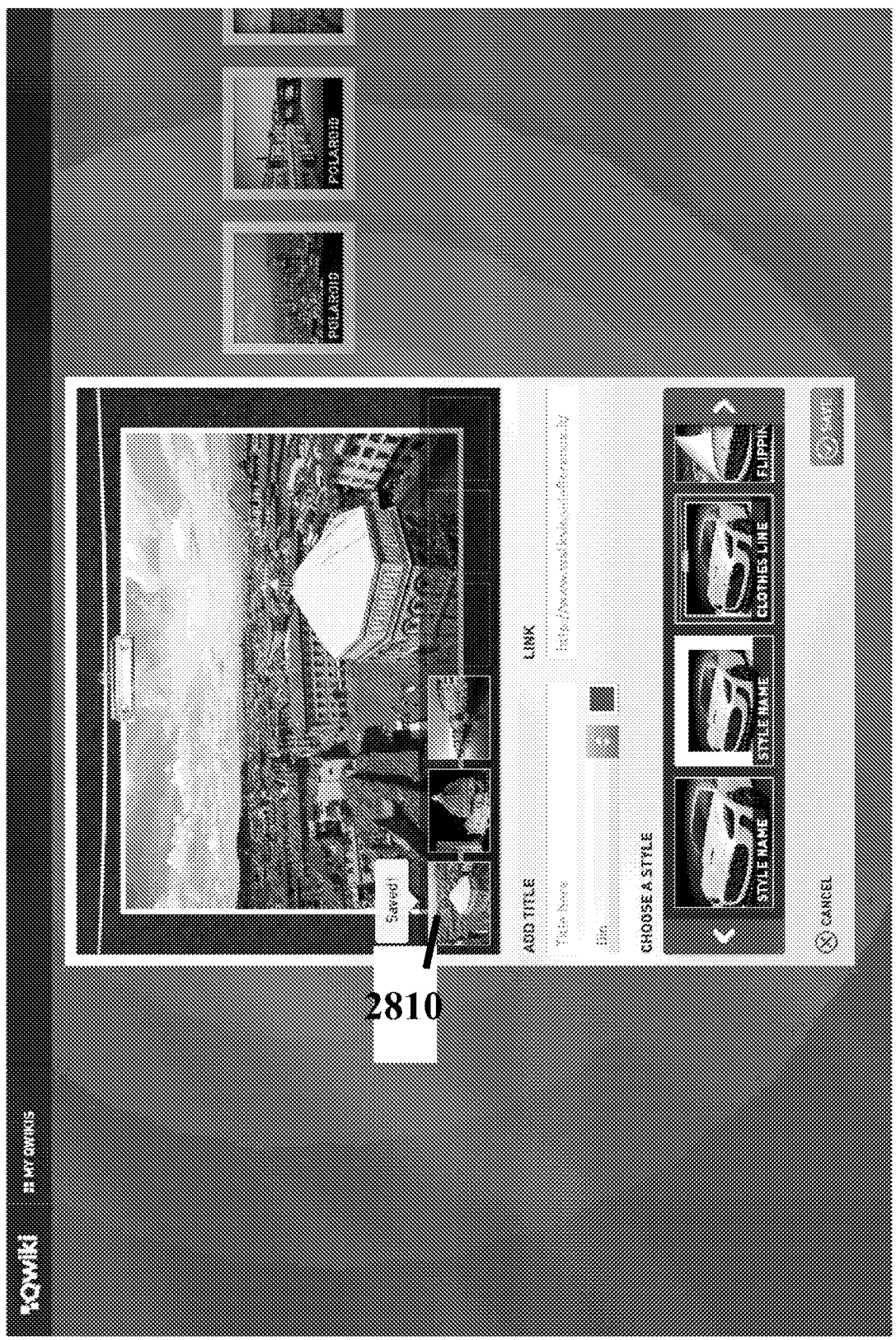
FIG. 28 is an illustration of a Mixed-Media Module creator showing aspects of attributes of example caption save implementations consistent with certain aspects related to the innovations herein.

FIG. 28 is an illustration of a Mixed-Media Module creator showing aspects of attributes of example caption save implementations consistent with certain aspects related to the innovations herein. Referring to FIG. 28 Referring to FIG. 28, the user can save the caption for each individual media portion and the system displays a notification 2810 indicating so.

Figure 29:
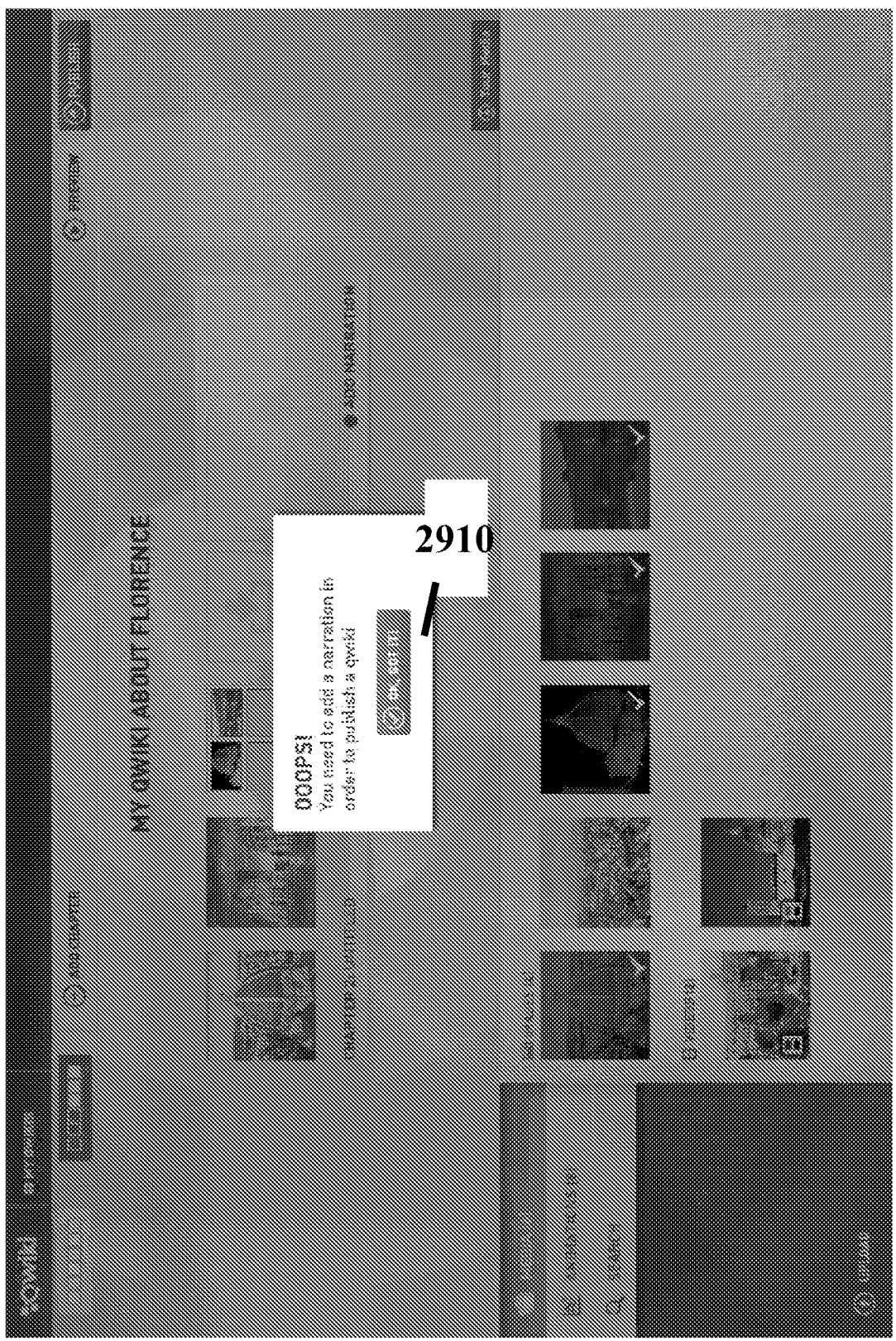
FIG. 29 is an illustration of a Mixed-Media Module creator showing aspects of example generic error implementations where the narration is missing consistent with certain aspects related to the innovations herein.

FIG. 29 is an illustration of a Mixed-Media Module creator showing aspects of example generic error implementations where the narration is missing consistent with certain aspects related to the innovations herein. Referring to FIG. 29, the system can indicate that there is a missing narration for the Mixed-Media Module and can indicate so with a notification box 2910.

Figure 30:
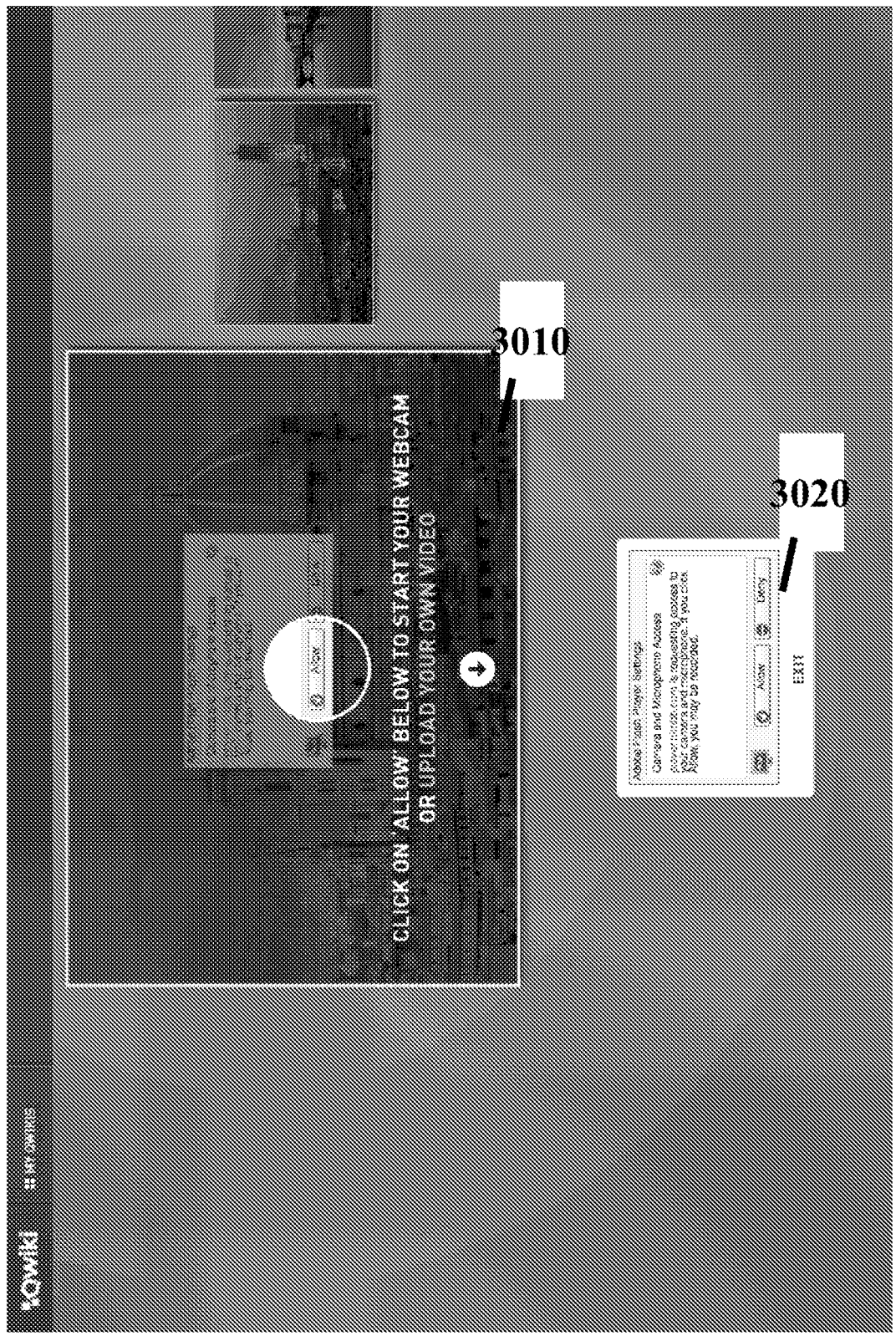
FIG. 30 is an illustration of a Mixed-Media Module creator showing aspects of adding example narration implementations consistent with certain aspects related to the innovations herein.

FIG. 30 is an illustration of a Mixed-Media Module creator showing aspects of adding example narration implementations consistent with certain aspects related to the innovations herein. Referring to FIG. 30, users can add audio narration to a Mixed-Media Module. The system prompts the user to allow the microphone to be accessed by the system through a notification box 3010. The user can click on the computer prompted microphone allowance button 3020. Or, the system allows the user to upload video to use as a narration.

Figure 31:
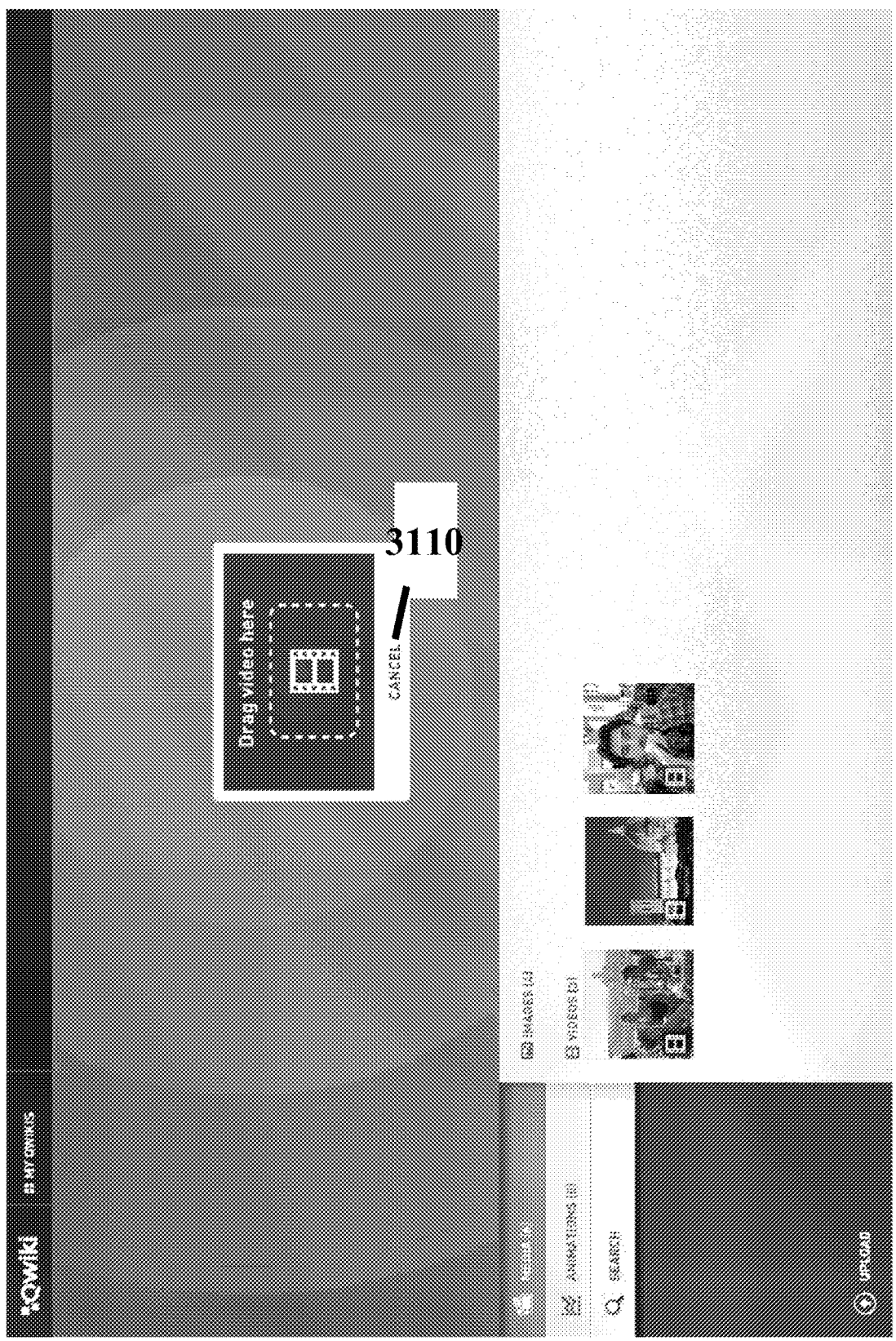
FIG. 31 is an illustration of a Mixed-Media Module creator showing aspects of example narration from a media library implementations consistent with certain aspects related to the innovations herein.

FIG. 31 is an illustration of a Mixed-Media Module creator showing aspects of example narration from a media library implementations consistent with certain aspects related to the innovations herein. Referring to FIG. 31, the user is able to add video as narration to the Mixed-Media Module through the drag and drop box 3110.

Figure 32:
FIG. 32 is an illustration of a Mixed-Media Module creator showing aspects of example narration from a media library add implementations consistent with certain aspects related to the innovations herein.

FIG. 32 is an illustration of a Mixed-Media Module creator showing aspects of example narration from a media library add implementations consistent with certain aspects related to the innovations herein. Referring to FIG. 32, the video narration is shown uploading to the system 3210.

Figure 33:
FIG. 33 is an illustration of a Mixed-Media Module creator showing aspects of enabled webcam implementations consistent with certain aspects related to the innovations herein.

FIG. 33 is an illustration of a Mixed-Media Module creator showing aspects of enabled webcam implementations consistent with certain aspects related to the innovations herein. Referring to FIG. 33, the user is able to record video and or audio from an attached webcam. The system prompts the user to hit a start recording button 3310 and shows the user the webcam video in a preview window 3320.

Figure 34:
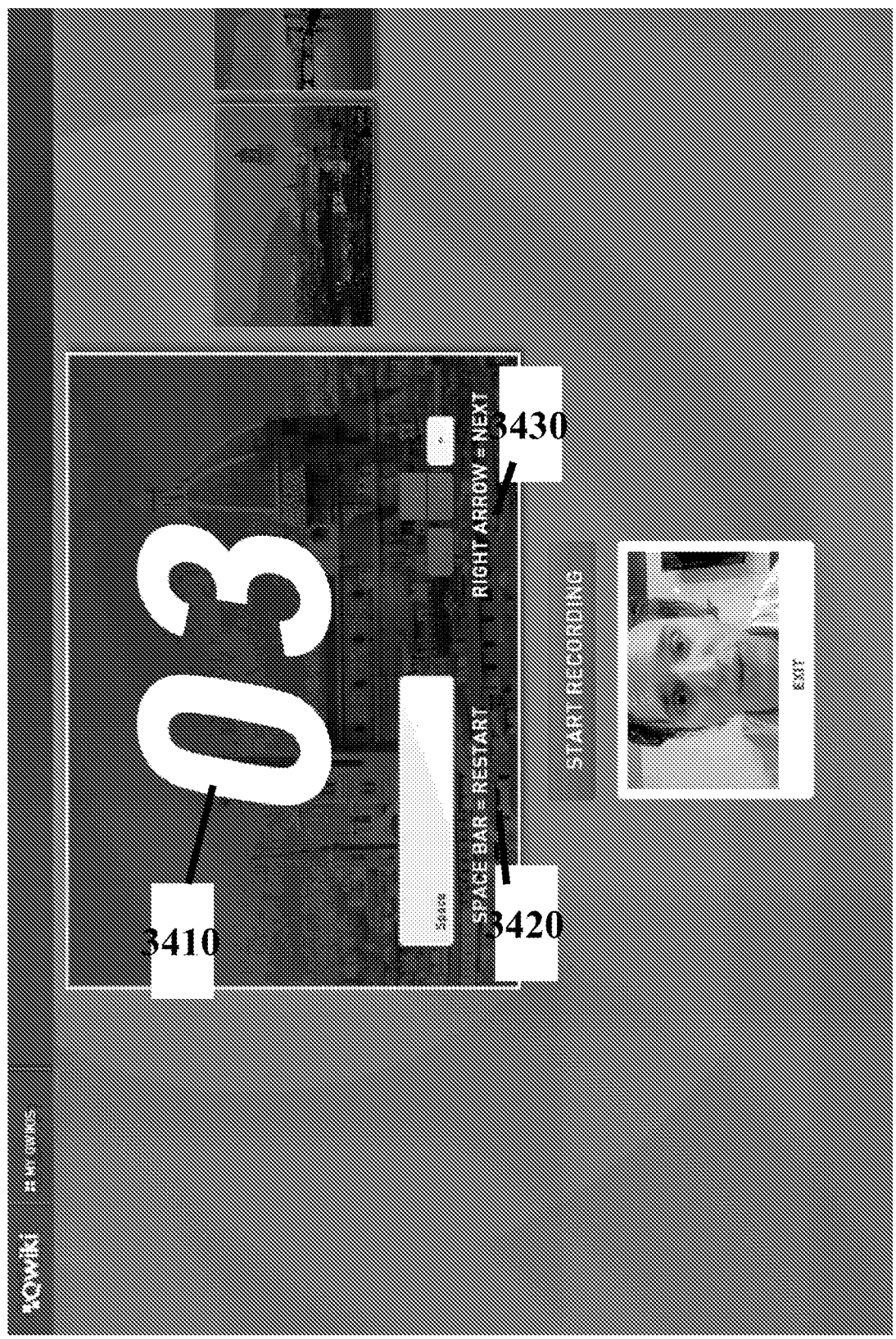
FIG. 34 is an illustration of a Mixed-Media Module creator showing aspects of example countdown and instruction implementations consistent with certain aspects related to the innovations herein.

FIG. 34 is an illustration of a Mixed-Media Module creator showing aspects of example countdown and instruction implementations consistent with certain aspects related to the innovations herein. Referring to FIG. 34, the system prompts the user to prepare to record the video from the webcam by a countdown display timer 3410. The user is able to restart the timer using a spacebar, as explained in the window 3420. Further, the user is able to navigate using the arrow keys as shown 3430.

Figure 35:
FIG. 35 is an illustration of a Mixed-Media Module creator showing aspects of an example first image implementations consistent with certain aspects related to the innovations herein.

FIG. 35 is an illustration of a Mixed-Media Module creator showing aspects of an example first image implementations consistent with certain aspects related to the innovations herein. Referring to FIG. 35, the Mixed-Media Module shows the first image of the presentation 3510. The timer is also shown as counting up as the Mixed-Media Module plays through 3520. The record light is shown 3530 as well.

Figure 36:
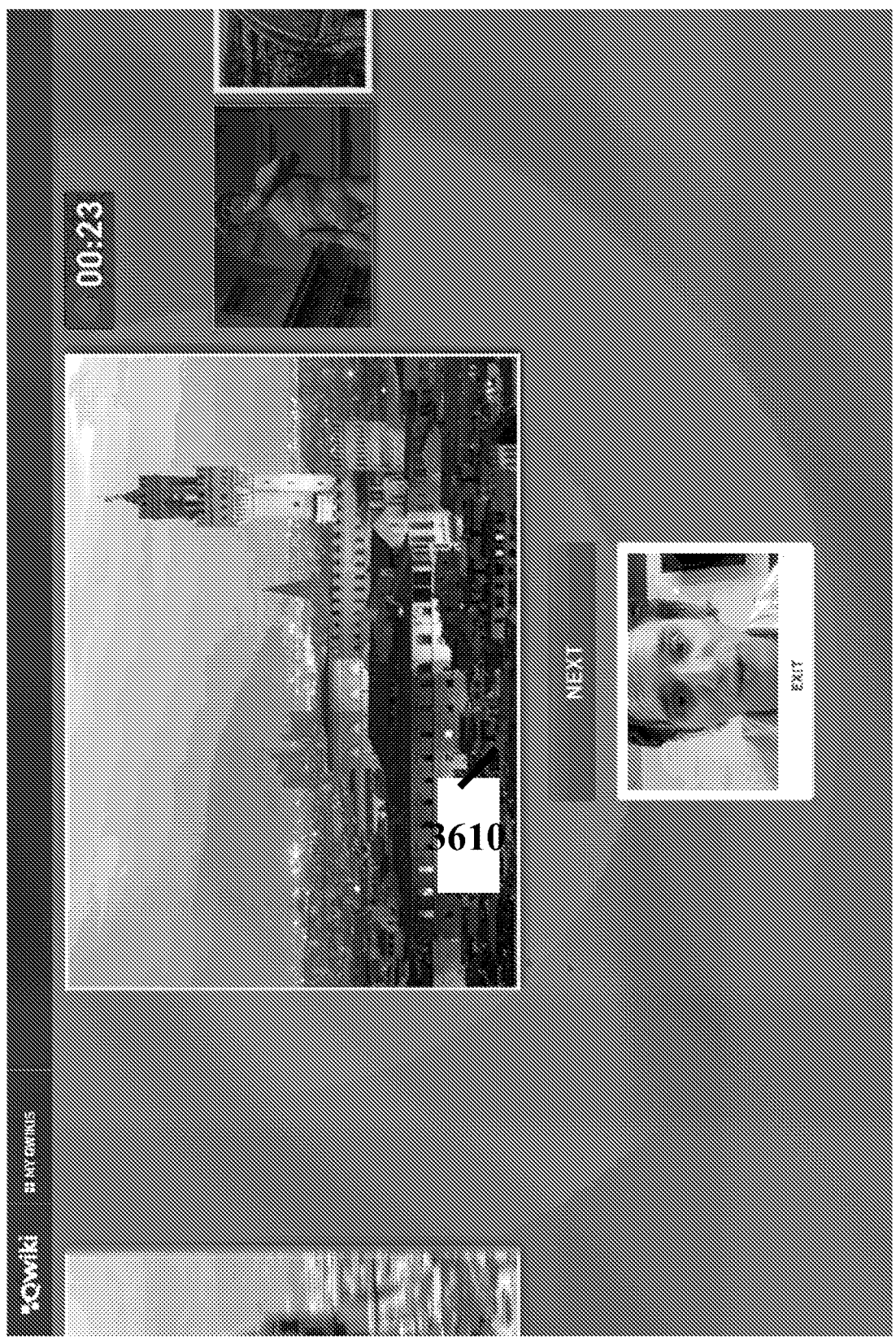
FIG. 36 is an illustration of a Mixed-Media Module creator showing aspects of an example second image implementations consistent with certain aspects related to the innovations herein.

FIG. 36 is an illustration of a Mixed-Media Module creator showing aspects of an example second image implementations consistent with certain aspects related to the innovations herein. Referring to FIG. 36, a second image 3610 is shown as the Mixed-Media Module progresses. The user is still narrating the video as it plays back and the timer 3520 progresses.

Figure 37:
FIG. 37 is an illustration of a Mixed-Media Module creator showing aspects of an example third image implementations consistent with certain aspects related to the innovations herein.

FIG. 37 is an illustration of a Mixed-Media Module creator showing aspects of an example third image implementations consistent with certain aspects related to the innovations herein. Referring to FIG. 37, a third image 3710 is shown as the Mixed-Media Module progresses. The user is still narrating the video as it plays back and the timer 3520 progresses.

Figure 38:
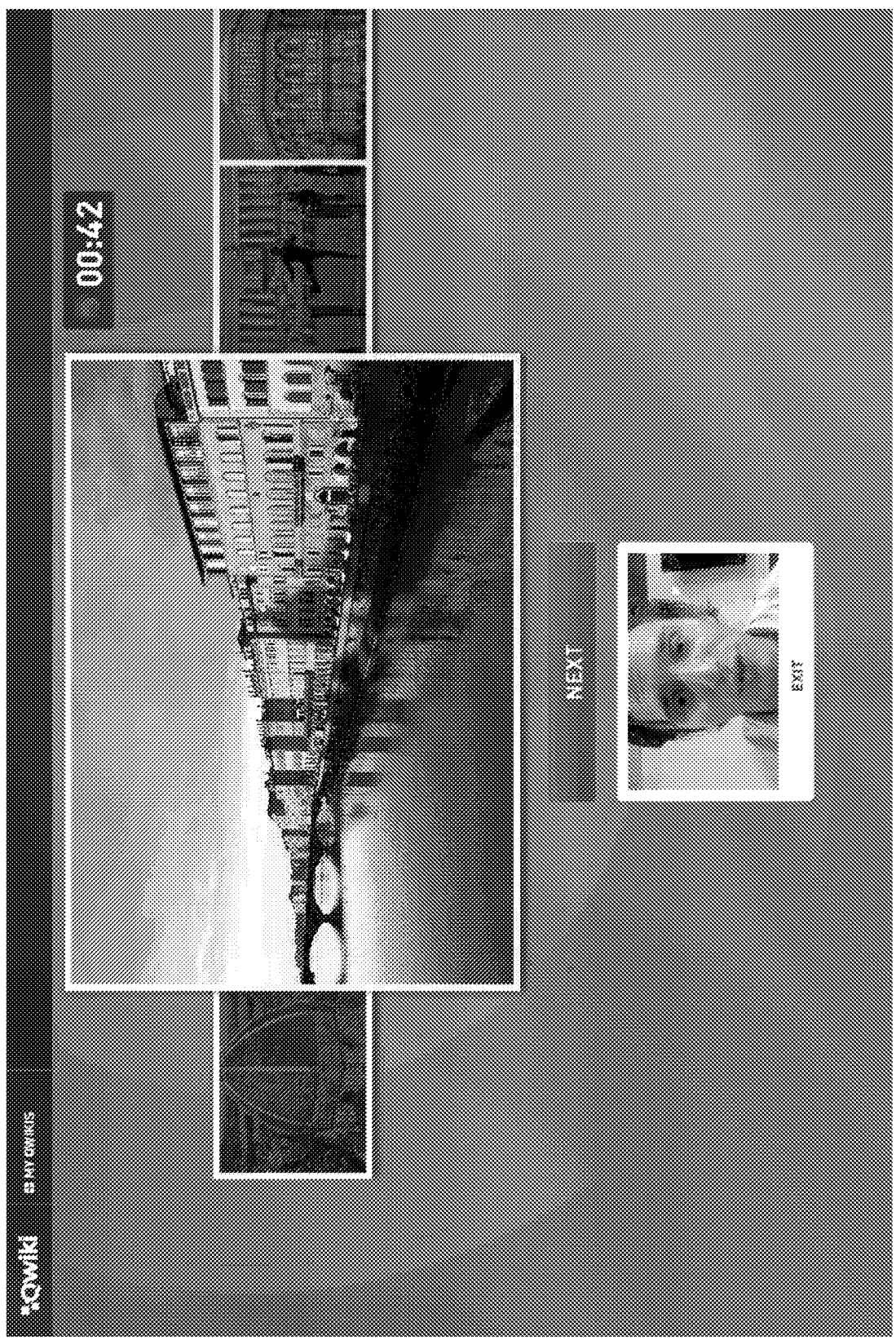
FIG. 38 is an illustration of a Mixed-Media Module creator showing aspects of an example visual list implementations consistent with certain aspects related to the innovations herein.

FIG. 38 is an illustration of a Mixed-Media Module creator showing aspects of an example visual list implementations consistent with certain aspects related to the innovations herein.

Figure 39:
FIG. 39 is an illustration of a Mixed-Media Module creator showing aspects of an example last image of a visual list implementations consistent with certain aspects related to the innovations herein.

FIG. 39 is an illustration of a Mixed-Media Module creator showing aspects of an example last image of a visual list implementations consistent with certain aspects related to the innovations herein. Referring to FIG. 39, a last image 3910 is shown as the Mixed-Media Module finishes.

Figure 40:
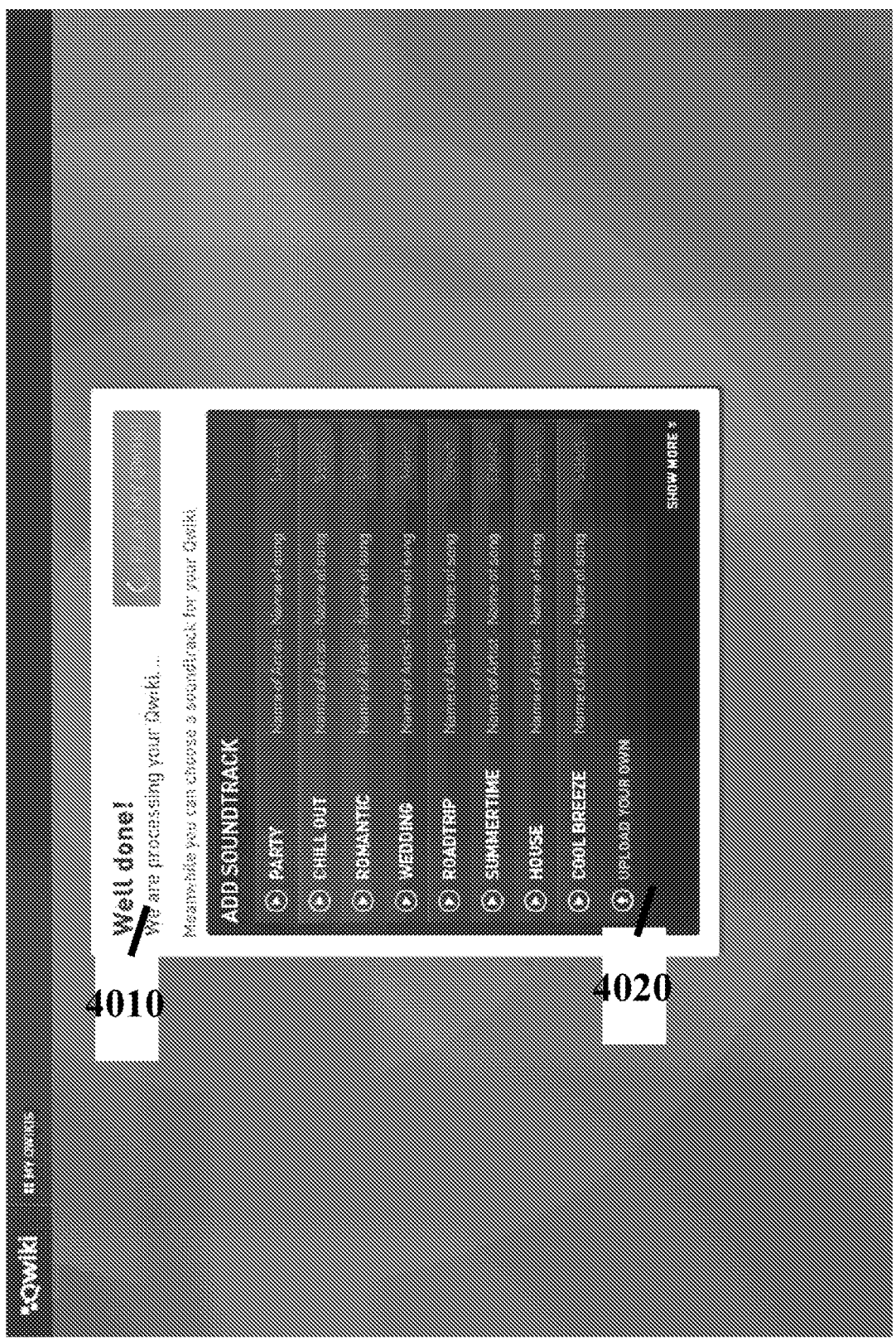
FIG. 40 is an illustration of a Mixed-Media Module creator showing aspects of example processing and soundtrack implementations consistent with certain aspects related to the innovations herein.

FIG. 40 is an illustration of a Mixed-Media Module creator showing aspects of example processing and soundtrack implementations consistent with certain aspects related to the innovations herein. Referring to FIG. 40, the soundtrack selection window 4010, allows users to choose an audio track for the Mixed-Media Module playback. Different audio tracks are displayed for the user to select in a categorized manner 4020. The soundtracks could take any number of variations and could be displayed in many ways, in a drop down menu, in a list, in a mosaic, etc.

Figure 41:
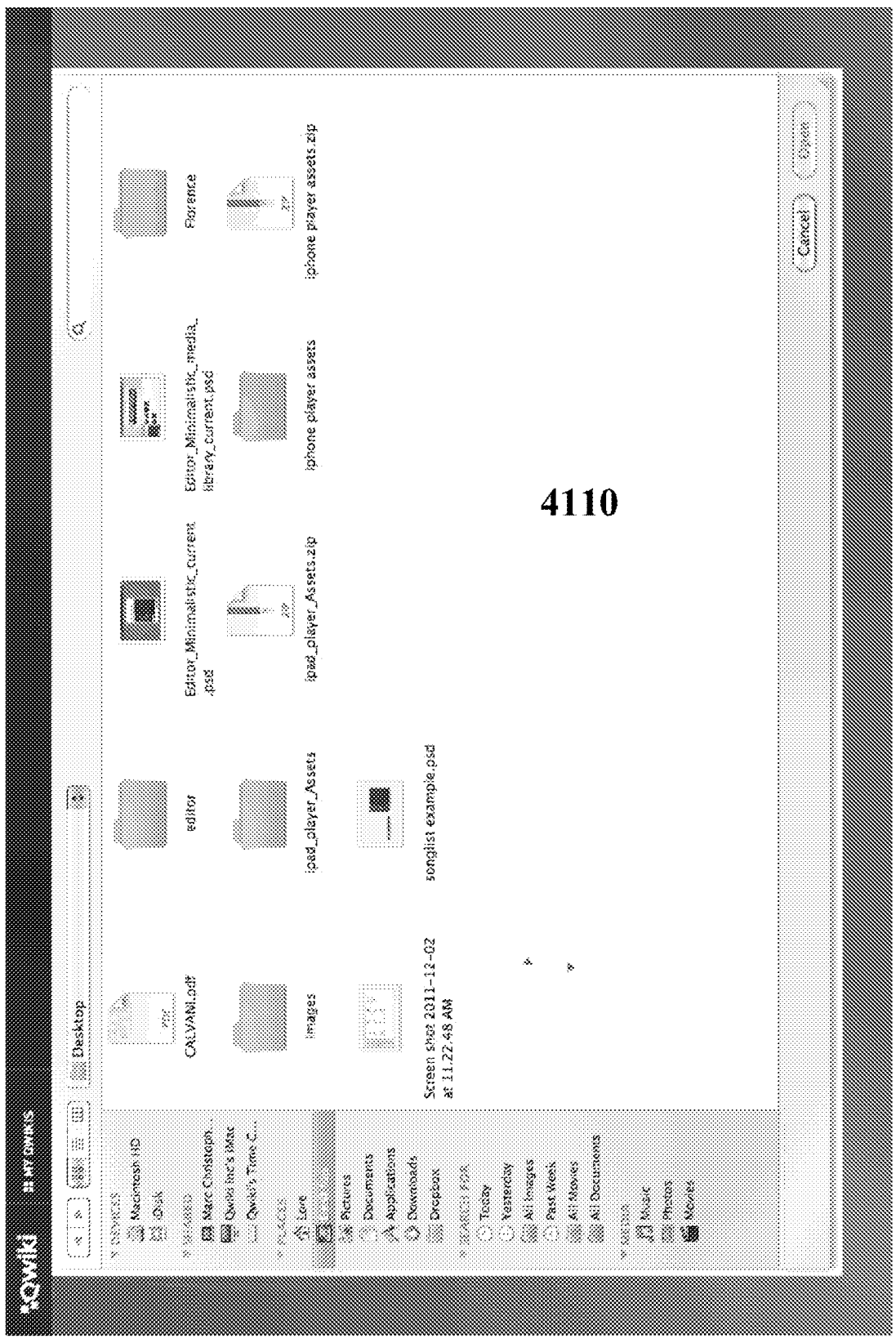
FIG. 41 is an illustration of a Mixed-Media Module creator showing aspects of example implementations where users are allowed to upload their own files consistent with certain aspects related to the innovations herein.

FIG. 41 is an illustration of a Mixed-Media Module creator showing aspects of example implementations where users are allowed to upload their own files consistent with certain aspects related to the innovations herein. Referring to FIG. 41, the hard drive or networked drives of the user's computer are accessed through the system 4110. Users can select a file to upload to their Mixed-Media Module through this example interface.

Figure 42:
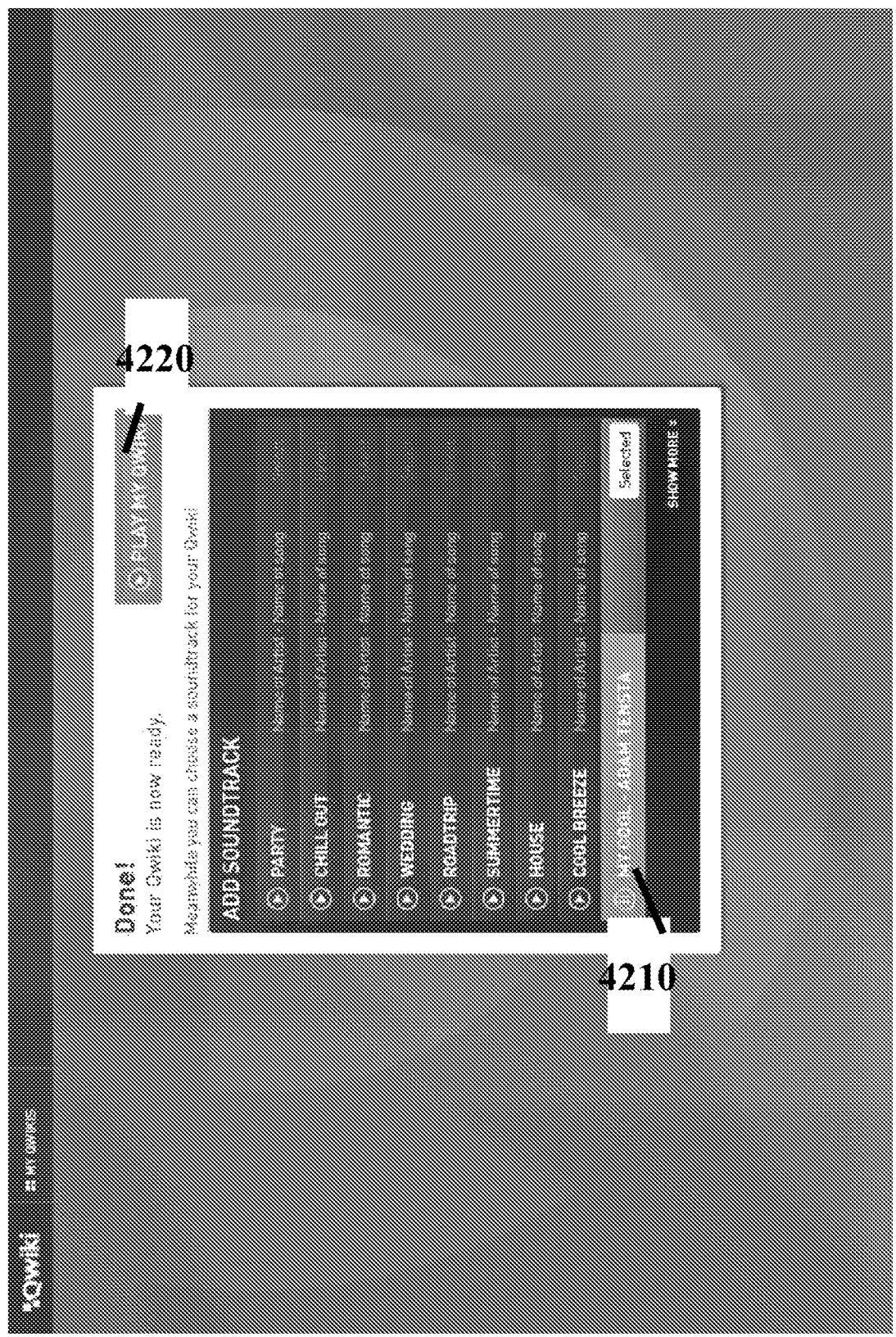
FIG. 42 is an illustration of a Mixed-Media Module creator showing aspects of example implementations where users are allowed to play their own files consistent with certain aspects related to the innovations herein.

FIG. 42 is an illustration of a Mixed-Media Module creator showing aspects of example implementations where users are allowed to play their own files consistent with certain aspects related to the innovations herein. Referring to FIG. 42, the user is able to start to play an audio file, as shown in the selected list 4210. The display also allows users to begin to play back the Mixed-Media Module by selecting the "play" button 4220.

Figure 43:
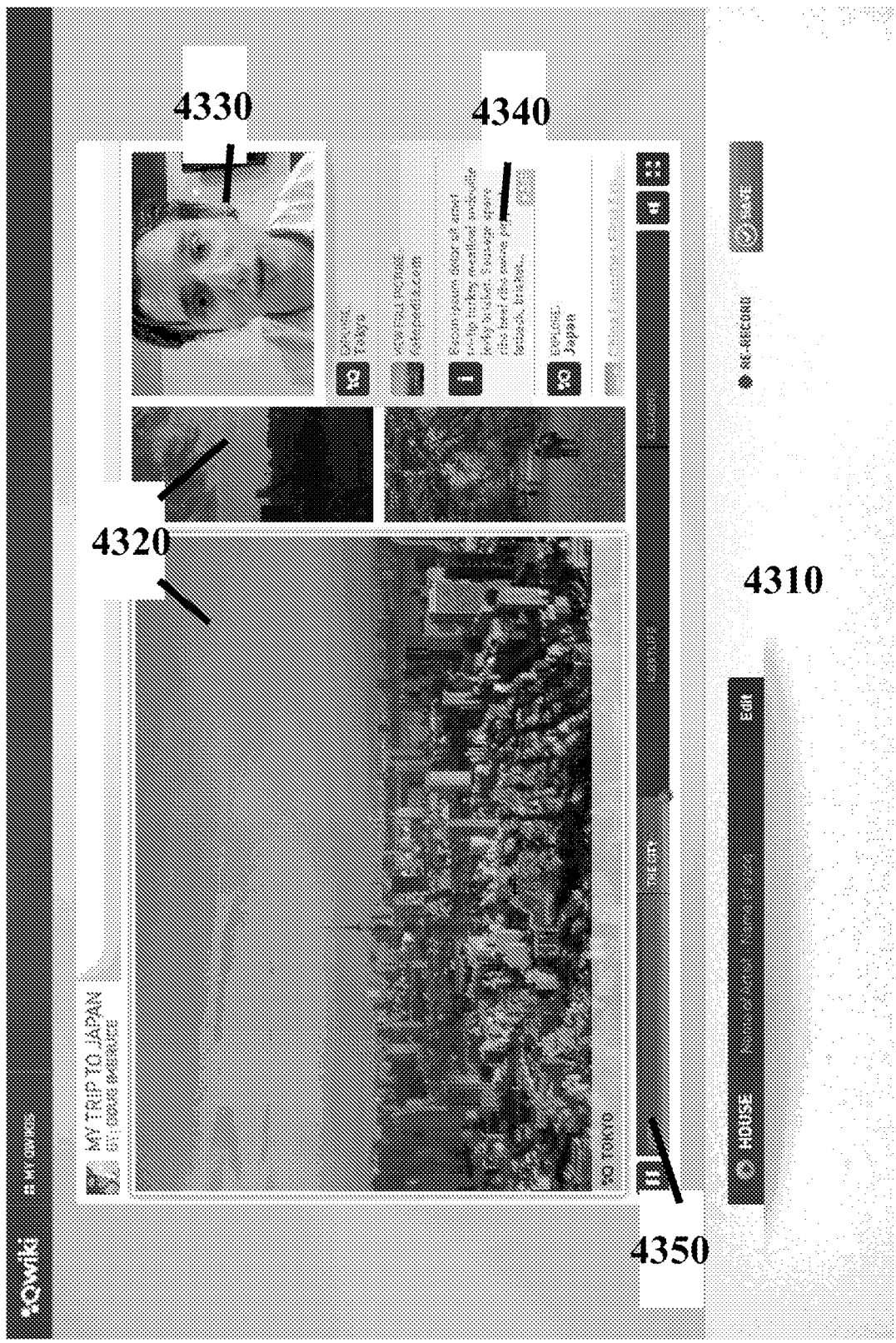
FIG. 43 is an illustration of a Mixed-Media Module creator showing aspects of example preview implementations consistent with certain aspects related to the innovations herein.

FIG. 43 is an illustration of a Mixed-Media Module creator showing aspects of example preview implementations consistent with certain aspects related to the innovations herein. Referring to FIG. 43, the example preview screen shows the playing back Mixed-Media Module 4310. The images are shown 4320 as well as the narration video 4330. Further, in this example, the system displays topics that a user can select to delve more deeply into a particular subject 4340. These selectable topics relate to different aspects of the overall Mixed-Media Module and allow for additional windows to pop open for a user to view that selected material. Other embodiments include the ability to navigate through different selectable topics within the Mixed-Media Module display itself. Further, the progress bar at the bottom of the Mixed-Media Module preview screen 4350 shows the location of the currently playing back Mixed-Media Module. Generalized topic names within the process bar indicate the chapter location in the module, in this example, "the city," "nightlife," and "karaoke" chapters.

Figure 44:
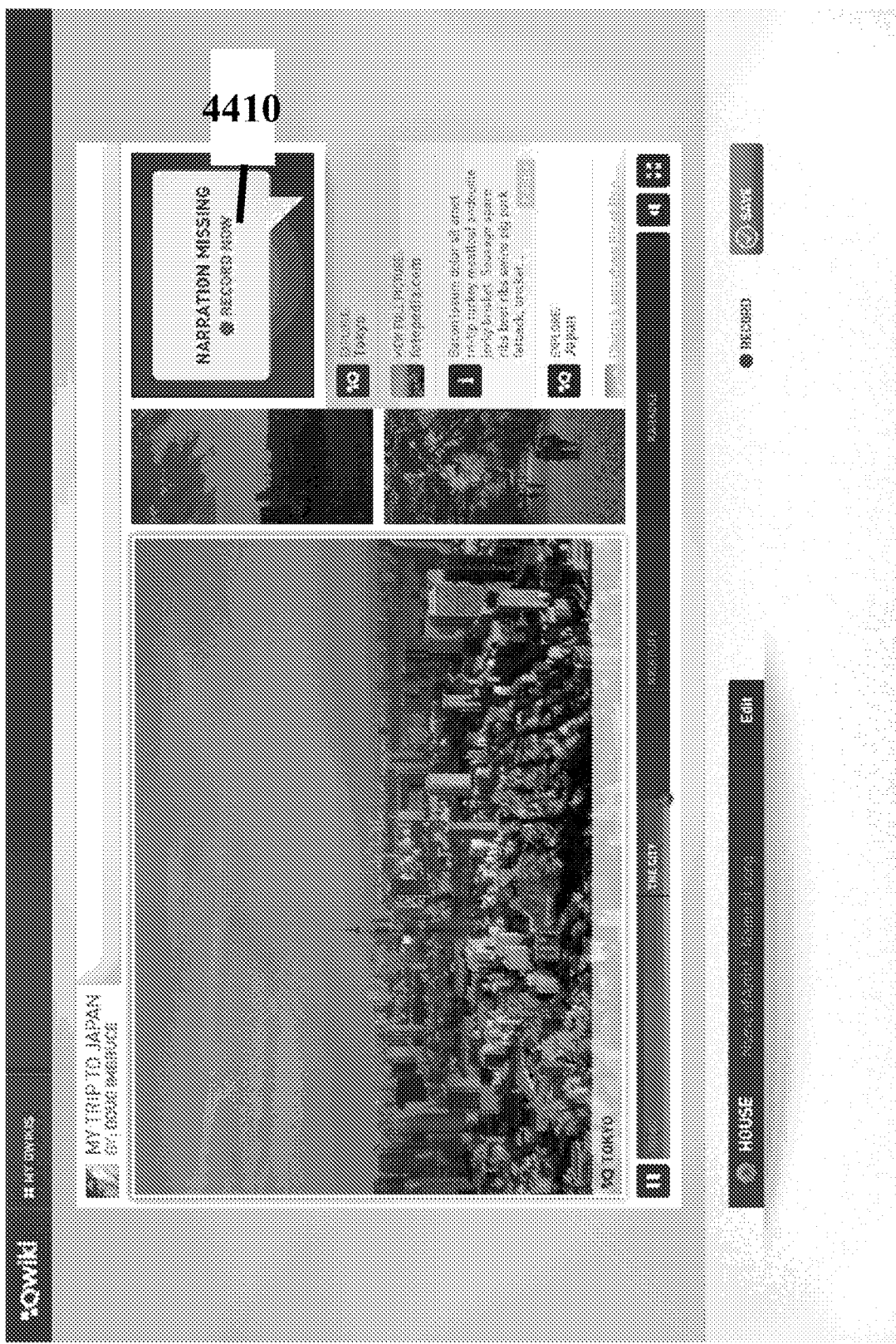
FIG. 44 is an illustration of a Mixed-Media Module creator showing aspects of example preview implementations, where the preview narration is missing, consistent with certain aspects related to the innovations herein.

FIG. 44 is an illustration of a Mixed-Media Module creator showing aspects of example preview implementations, where the preview narration is missing, consistent with certain aspects related to the innovations herein. Referring to FIG. 44, the Mixed-Media Module example shows that the narration portion is missing through a notification 4410. The user can, to help finalize the Mixed-Media Module, record a narration by clicking the icon 4410.

Figure 45:
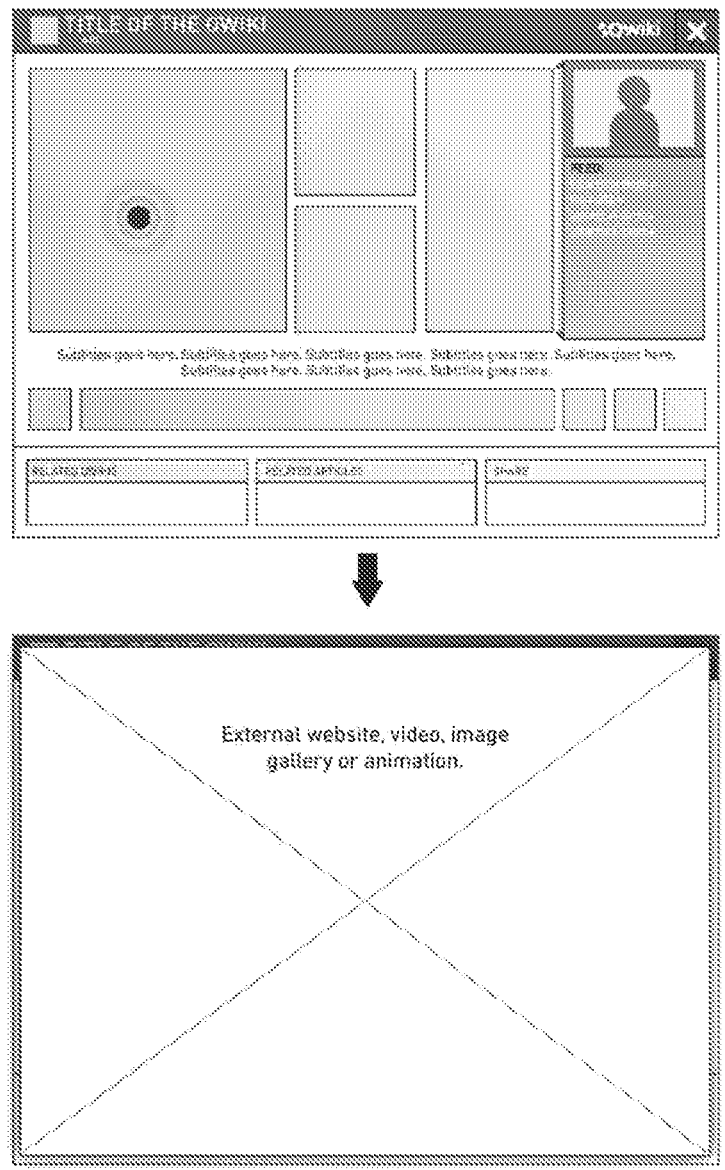
FIG. 45 is an illustration showing an example gesture consistent with certain aspects related to the innovations herein.

FIG. 45 is an illustration showing an example gesture consistent with certain aspects related to the innovations herein. Referring now to FIG. 45 an example Gesture is shown consistent with aspects of the innovations herein. Here, within a Mixed-Media Module, systems and methods herein may be configured to respond to a user tap or click of an object in the grid or in the feed to open another Mixed-Media Module, webpage, video, or detailed animation in an overlay over the current screen. Thus, some embodiments include methods wherein the interaction includes a tap of a portion, button or link of the selected multimedia presentation used in the generation of the new search results page.

Figure 46:
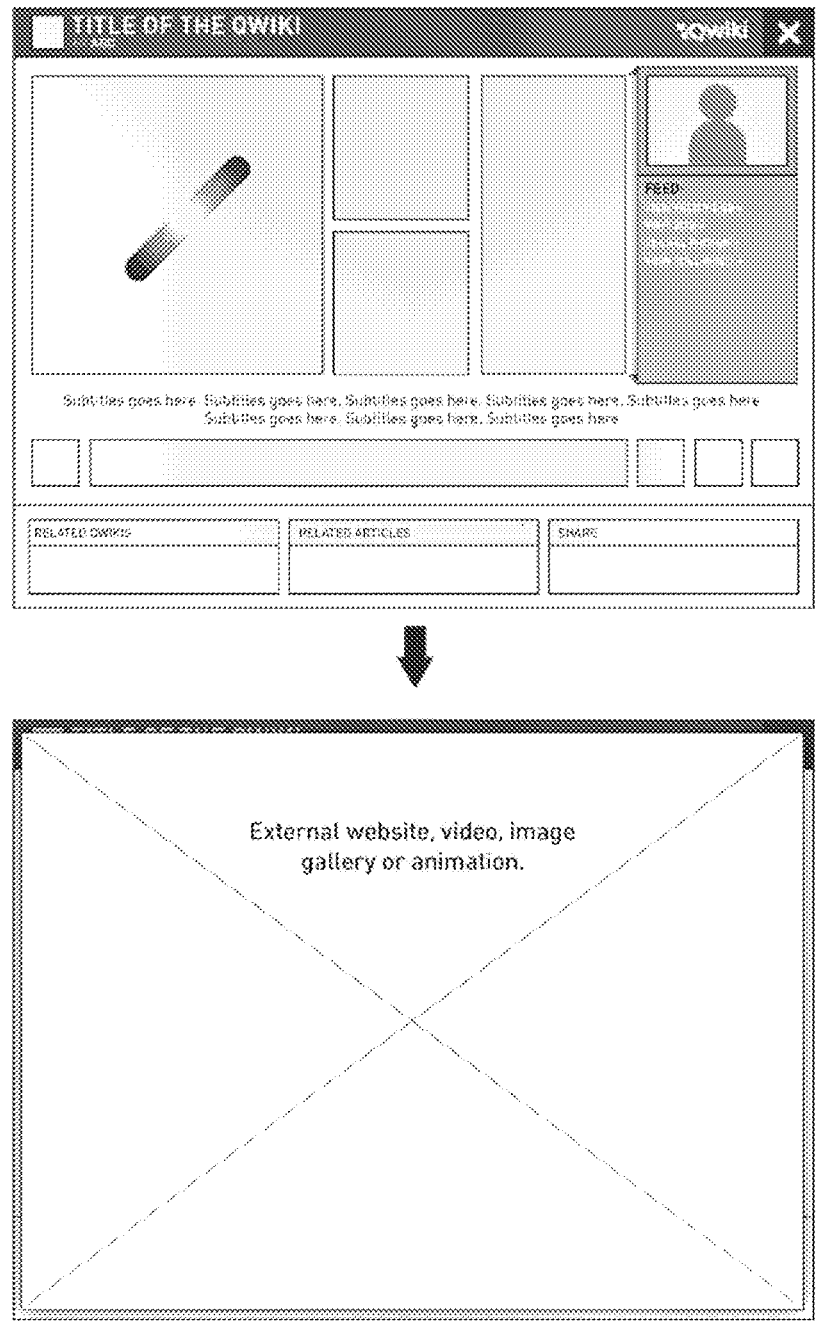
FIG. 46 is an illustration showing an example gesture consistent with certain aspects related to the innovations herein.

FIG. 46 is an illustration showing an example gesture consistent with certain aspects related to the innovations herein. Referring to FIG. 46, another example Gesture is shown consistent with aspects of the innovations herein. Here, a user can pinch into an object in the grid to see detailed or related information on the object including source, related media, access interactive animations, view full video, read full article, and the like. Thus, some embodiments include methods wherein interactions include a pinch of a portion, button or link of the selected multimedia presentation used in the generation of a search results page.

Figure 47:
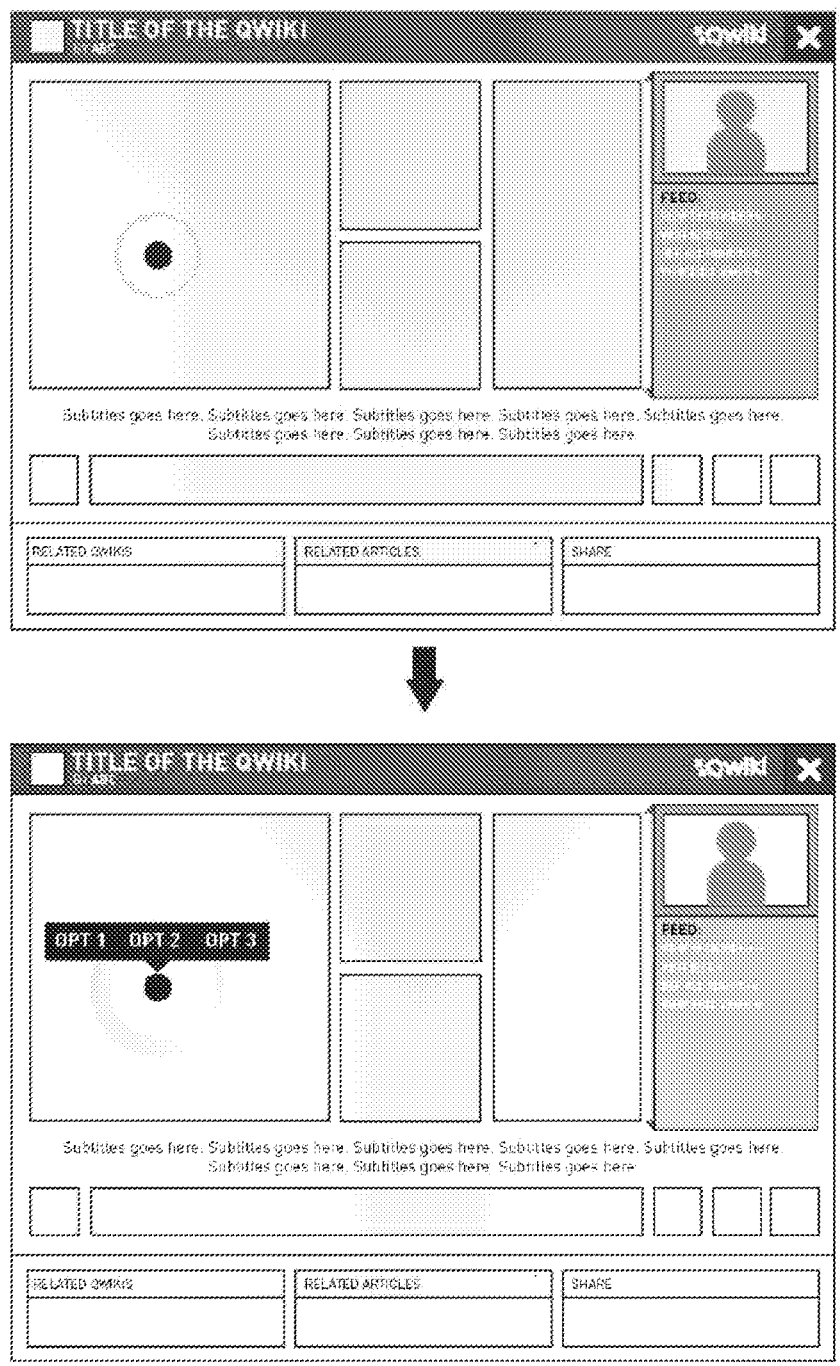
FIG. 47 is an illustration showing an example gesture consistent with certain aspects related to the innovations herein.

FIG. 47 is an illustration showing an example gesture consistent with certain aspects related to the innovations herein. Referring to FIG. 47, another example Gesture is shown, consistent with aspects of the innovations herein. Here, for example, systems and methods herein may be configured such that a user can tap or click and hold on an element in the grid or in the feed to provide various or additional options. Such options may include, though are not limited to, open now, queue for later, add to favorites, etc. Thus, some embodiments include methods wherein interactions include a tap and hold of a portion, button or link of the selected multimedia presentation used in the generation of the new search results page.

Figure 48:
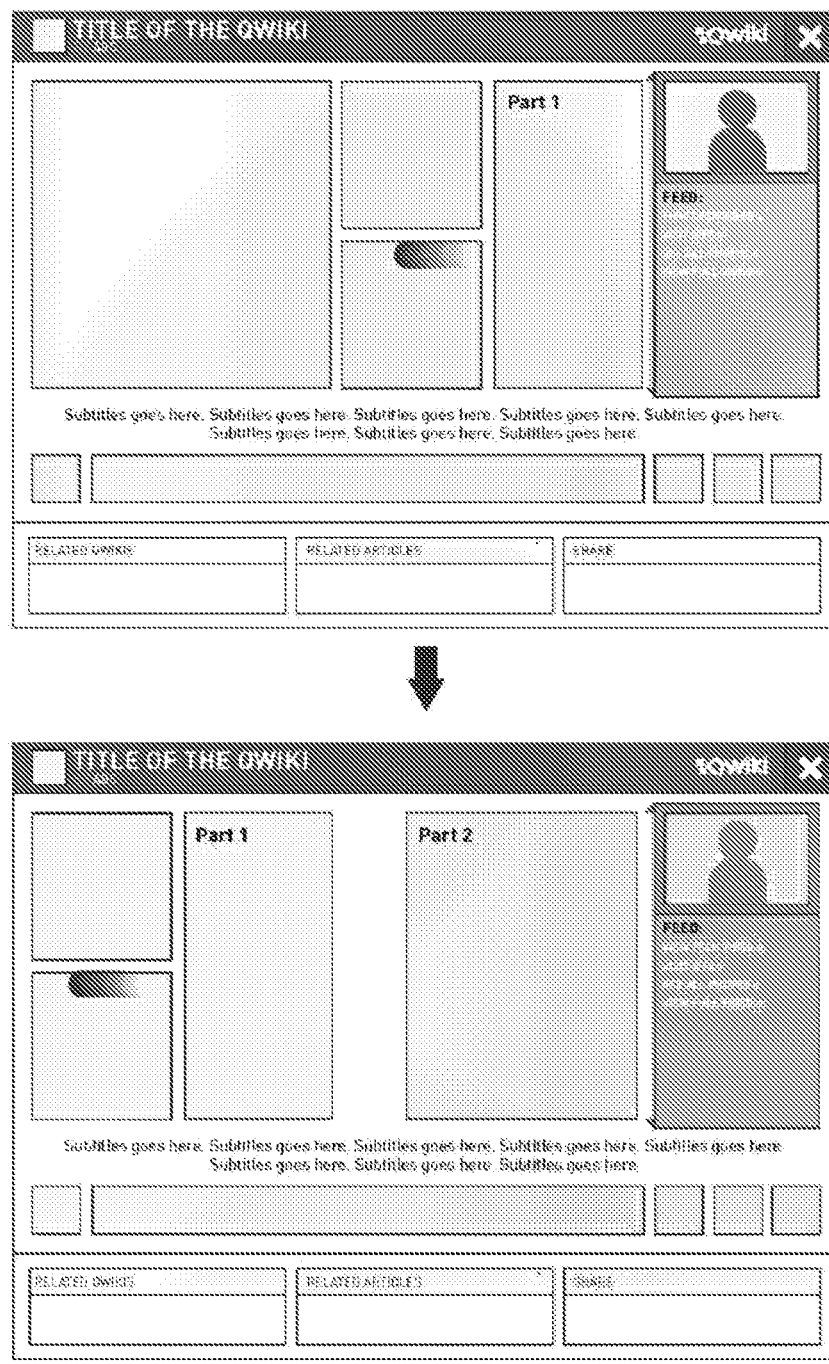
FIG. 48 is an illustration showing an example gesture consistent with certain aspects related to the innovations herein.

FIG. 48 is an illustration showing an example gesture consistent with certain aspects related to the innovations herein. Referring to FIG. 48, another example Gesture is shown consistent with aspects of the innovations herein. Here, a user can swipe or scroll with one finger left or right over the grid to advance or rewind the presentation of the mixed-media. Thus, some embodiments include methods wherein interactions include a swipe or scroll of a portion, button or link of the selected multimedia presentation used in the generation of the new search results page.

With regard to certain aspects of the innovations herein, another way that implementations herein are an improvement over the traditional information conveyance, especially from online video, is that that the mixed-media modules are specifically configured such that the end user is not required to experience the module in a linear fashion. A user can readily jump to different collections of media once a quick scan assures them the present set of options do not include anything they wish to see further, know more about, etc. Modules may also be configured such that users can also choose their path through the content by clicking on hyperlinks (meta-data) within the mixed-media module. This allows the end-user to explore the information that is of the most interest to them, in greater detail and in their preferred format (i.e. text, photos, or video). Innovations herein also work across multiple platforms. For example, mixed-media module interactive components herein can run inside a standard web browser and its player software can be integrated into mobile devices, TV devices, video game units, etc. Further, such mixed-media module(s) may be configured as a universal component across all media and devices.

In the description here, it is to be understood that both mouse/cursor enabled computing devices, and those without cursors, but use touch screen technologies are both fully supported. To that, the terms "click" or "tap" or "touch" can be used synonymously and interchangeably. Thus, a click-through is the same as a tap-through or any other term with the equivalent meaning. The mobile wireless devices can be touch screen enabled, using a stylus or finger or other such thing to interact with the screen, and objects on the screen. The touch screen enabled technologies also allow for pinching in or out to zoom in or out or enlarge or shrink an object or the display. Sliding a touch can scroll either in vertical or horizontal directions, or any other direction supported by the system. The touch screens can also detect a prolonged tap, opening further functionality when a prolonged tap and hold occurs on an object. In devices that do not support a touch screen, such functionality can be accomplished by a cursor or pointer of some sort, typically controlled by a mouse, pointer stick, roller ball, etc. There may be additional functionality embedded into the display objects to allow for some of the functionality such as a scroll bar or zoom buttons, etc. These functionalities are also fully supported here and can be used interchangeably with the touch screen enabled technologies.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) within or associated with the computing elements, sensors, receivers, etc. disclosed above, e.g., to be read by a processing unit to implement the functions of the innovations herein. Or, the modules can comprise programming instructions transmitted to a general purpose computer or to processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the location estimate features, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied to include, but are not limited to, non-volatile storage media in various forms (e.g., optical, magnetic or semiconductor storage media), though do not include non-tangible media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more implementations of the following invention

The invention claimed is:

1. A method comprising:
   communicating, by a processor, a mixed-media module creator interface to a first client device, the mixed-media module creator interface configured to:
      enable a first user of the first client device to create a mixed-media module, the mixed-media module being a web-based tool for compiling and rendering mixed-media types within modules that are integrated into a media player, the mixed-media module comprising both an updatable portion and a searchable portion, the updatable portion comprising an indication of a number of files currently associated with the created mixed-media module, the searchable portion being locatable by a search engine in response to a search query, said enabled creation of the mixed-media module further comprises enabling creation of a non-linear path between the associated files within the mixed-media module;
   receiving, by the processor, said created mixed media module; and
   communicating, by the processor, a mixed-media module player interface to a second client device, the mixed-media module player interface being different than the mixed-media module creator interface,
      said communication of the mixed-media module player interface to the second client device causing, upon reception of the mixed-media player interface at the second client device, the second client device to automatically play the associated files of the mixed-media module in an asynchronous, non-linear format according to the created non-linear path of the created mixed media module, said asynchronous, non-linear formatted streamed rendering of the associated files comprising a coordinated rendering of each file in a plurality of screen formats and windows as dictated by a type of each associated file.

2. The method of claim 1, wherein the mixed-media module creator interface enabling the first user to create the mixed-media module further comprises enabling the first user to create a mixed-media module comprising hyperlinks.

3. The method of claim 2, wherein the mixed-media module player interface further comprises receiving, by the mixed-media module player interface, a click on one of the hyperlinks.

4. The method of claim 3, wherein the receiving of the click further comprises playing the mixed-media module at a location associated with the clicked hyperlink.

5. The method of claim 1, wherein the mixed-media module creator interface configured to enable the first user to create the mixed-media module further comprises enabling the first user to select a plurality of types of content and drop the selected content into a narrative presentation outline to create a presentation of media.

6. The method of claim 1, wherein the mixed-media module creator interface configured to enable the first user to create the mixed-media module further comprises enabling the first user to create a mixed-media module comprising metadata.

7. The method of claim 1, wherein the communicating the mixed-media module creator interface further comprises communicating a mixed-media module creator interface comprising filters for creation of special effects and graphics.

8. A computing device comprising:
   a processor; and
   a non-transitory computer-readable storage medium for tangibly storing thereon program logic for execution by the processor, the program logic comprising:
   logic executed by the processor for communicating a mixed-media module creator interface to a first client device, the mixed-media module creator interface configured to:
      enable a first user of the first client device to create a mixed-media module, the mixed-media module being a web-based tool for compiling and rendering mixed-media types within modules that are integrated into a media player, the mixed-media module comprising both an updatable portion and a searchable portion, the updatable portion comprising an indication of a number of files currently associated with the created mixed-media module, the searchable portion being locatable by a search engine in response to a search query, said enabled creation of the mixed-media module further comprises enabling creation of a non-linear path between the associated files within the mixed-media module;
   logic executed by the processor for receiving said created mixed media module; and
   logic executed by the processor for communicating a mixed-media module player interface to a second client device, the mixed-media module player interface being different than the mixed-media module creator interface,
      said communication of the mixed-media module player interface to the second client device causing, upon reception of the mixed-media player interface at the second client device, the second client device to automatically play the associated files of the mixed-media module in an asynchronous, non-linear format according to the created non-linear path of the created mixed media module, said asynchronous, non-linear formatted streamed rendering of the associated files comprising a coordinated rendering of each file in a plurality of screen formats and windows as dictated by a type of each associated file.

9. The computing device of claim 8, wherein the creator communicating logic for communicating the mixed-media module creator interface further enables the first user to create a mixed-media module comprising hyperlinks.

10. The computing device of claim 9, wherein the player communicating logic for communicating the mixed-media module player interface further comprises receiving logic executed by the processor for receiving, by the mixed-media module player interface, a click on one of the hyperlinks.

11. The computing device of claim 10, wherein the receiving logic further comprises playing logic executed by the processor for playing the mixed-media module at a location associated with the clicked hyperlink.

12. The computing device of claim 8, wherein the mixed-media module creator interface configured to enable the first user to create the mixed-media module further comprises enabling logic executed by the processor for enabling the first user to select a plurality of types of content and drop the selected content into a narrative presentation outline to create a presentation of media.

13. The computing device of claim 8, wherein the mixed-media module creator interface configured to enable the first user to create the mixed-media module further comprises enabling logic executed by the processor for enabling the first user to create a mixed-media module comprising metadata.

14. The computing device of claim 8, wherein the creator communicating logic further comprises second creator communicating logic for communicating a mixed-media module creator interface comprising filters for creation of special effects and graphics.

15. A non-transitory computer readable storage medium for tangibly storing computer program instructions capable of being executed by a computer processor, the computer program instructions defining the steps of:

communicating, by the computer processor, a mixed-media module creator interface to a first client device, the mixed-media module creator interface configured to:

enable a first user of the first client device to create a mixed-media module, the mixed-media module being a web-based tool for compiling and rendering mixed-media types within modules that are integrated into a media player, the mixed-media module comprising both an updatable portion and a searchable portion, the updatable portion comprising an indication of a number of files currently associated with the created mixed-media module, the searchable portion being locatable by a search engine in response to a search query, said enabled creation of the mixed-media module further comprises enabling creation of a non-linear path between the associated files within the mixed-media module;

receiving, by the processor, said created mixed media module; and communicating, by the computer processor, a mixed-media module player interface to a second client device, the mixed-media module player interface being different than the mixed-media module creator interface, said communication of the mixed-media module player interface to the second client device causing, upon reception of the mixed-media player interface at the second client device, the second client device to automatically play the associated files of the mixed-media module in an asynchronous, non-linear format according to the created non-linear path of the created mixed media module, said asynchronous, non-linear formatted streamed rendering of the associated files comprising a coordinated rendering of each file in a plurality of screen formats and windows as dictated by a type of each associated file.

* * * * *